(12) United States Patent
Nick

(10) Patent No.: US 12,397,502 B1
(45) Date of Patent: Aug. 26, 2025

(54) POLYMER-SYNTHESIZING BINDER COMPOSITIONS FOR ADDITIVE FABRICATION AND RELATED METHODS AND COMPOSITIONS

(71) Applicant: Desktop Metal, Inc., Burlington, MA (US)

(72) Inventor: Robert J. Nick, Pepperell, MA (US)

(73) Assignee: Desktop Metal, Inc., Burlington, MA (US)

( * ) Notice: Subject to any disclaimer, the term of this patent is extended or adjusted under 35 U.S.C. 154(b) by 328 days.

(21) Appl. No.: 18/084,802

(22) Filed: Dec. 20, 2022

Related U.S. Application Data

(60) Provisional application No. 63/291,715, filed on Dec. 20, 2021.

(51) Int. Cl.
*B29C 64/165* (2017.01)
*B22F 10/14* (2021.01)
*B29K 67/00* (2006.01)
*B29K 105/00* (2006.01)
*B33Y 10/00* (2015.01)
*B33Y 70/00* (2020.01)

(52) U.S. Cl.
CPC ............ *B29C 64/165* (2017.08); *B22F 10/14* (2021.01); *B33Y 10/00* (2014.12); *B33Y 70/00* (2014.12); *B29K 2067/003* (2013.01); *B29K 2105/0002* (2013.01)

(58) Field of Classification Search
CPC ....... B29C 64/165; B33Y 10/00; B33Y 70/00; B22F 10/14; B29K 2067/003; B29K 2105/0002
See application file for complete search history.

(56) References Cited

U.S. PATENT DOCUMENTS

| | | | |
|---|---|---|---|
| 5,076,869 A | 12/1991 | Bourell et al. | |
| 5,358,789 A * | 10/1994 | Kuo | C08G 63/60 525/437 |
| 5,745,834 A | 4/1998 | Bampton et al. | |
| 6,007,764 A | 12/1999 | Benda et al. | |
| 6,048,667 A | 4/2000 | Eldin et al. | |
| 6,048,954 A | 4/2000 | Barlow et al. | |
| 6,365,093 B1 | 4/2002 | Ryang et al. | |
| 11,618,212 B2 | 4/2023 | Myerberg et al. | |
| 2005/0059757 A1 | 3/2005 | Bredt et al. | |
| 2006/0251535 A1 | 11/2006 | Pfeifer et al. | |
| 2007/0183918 A1 | 8/2007 | Monsheimer et al. | |
| 2014/0050921 A1 | 2/2014 | Lyons et al. | |
| 2016/0271875 A1 | 9/2016 | Brown, Jr. | |
| 2016/0272844 A1 * | 9/2016 | Osaka | B22F 1/102 |
| 2020/0298475 A1 | 9/2020 | Myerberg et al. | |
| 2021/0069785 A1 * | 3/2021 | Nakamura | B22F 1/102 |

OTHER PUBLICATIONS

U.S. Appl. No. 18/193,505, filed Mar. 30, 2023, Myerberg et al.

* cited by examiner

*Primary Examiner* — Ricardo D Morales

(57) ABSTRACT

Techniques are described for fabricating sinterable metallic parts by coating a metal powder with a first material, and by depositing a binder composition onto the metal powder that contains a second material, then causing the first and second materials to react to form a polymer. The first and second materials may be selected so that they combine to produce a desired polymer. The binder composition may be deposited using conventional binder jetting techniques.

15 Claims, 12 Drawing Sheets

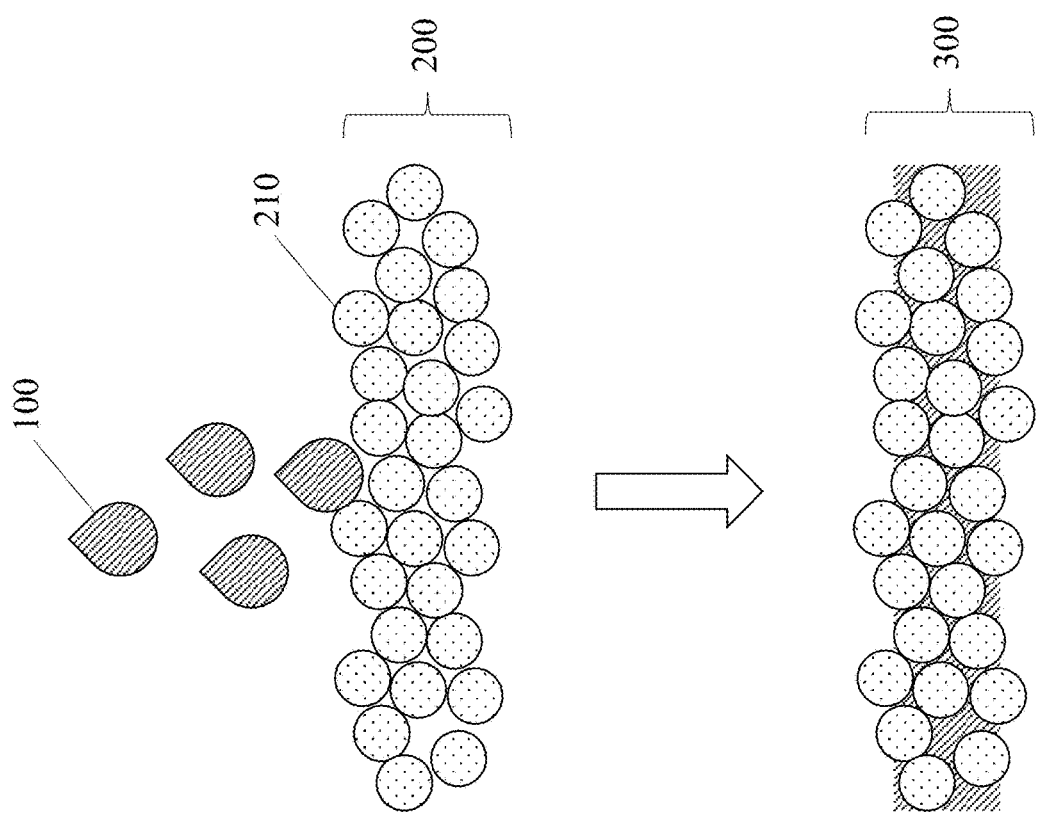

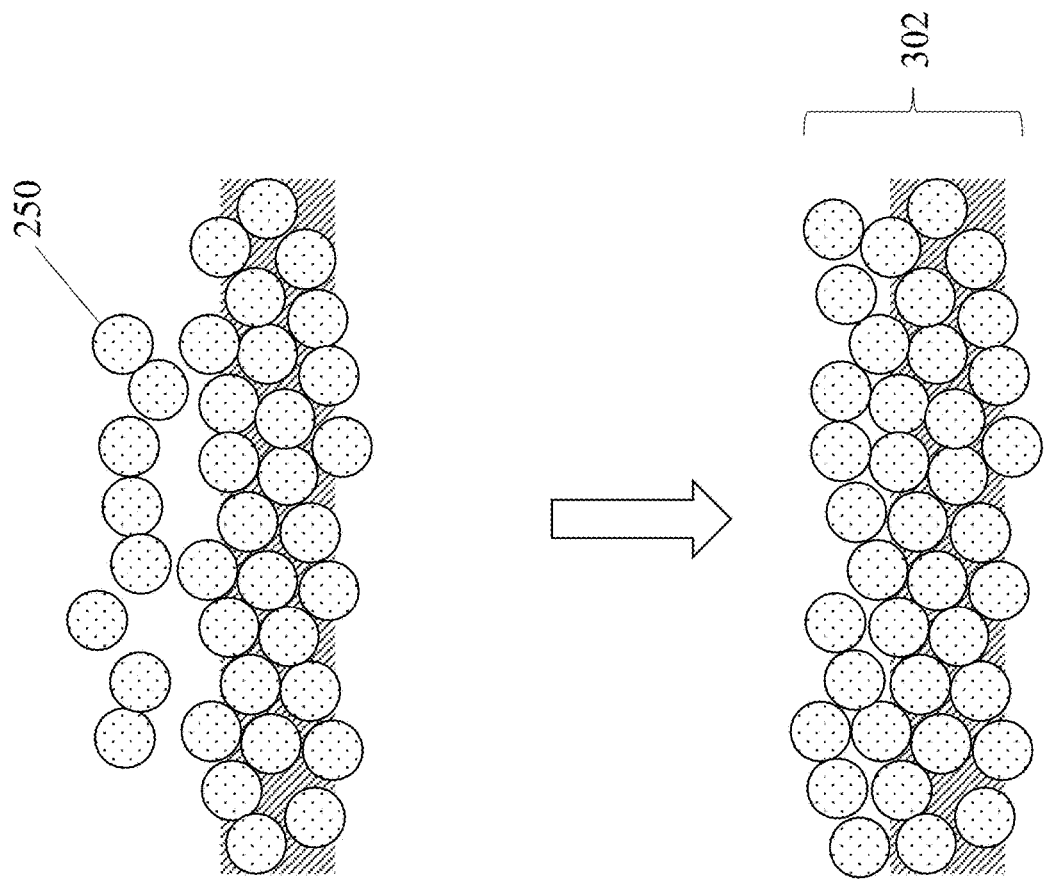

POLYMER-SYNTHESIZING BINDER COMPOSITIONS FOR ADDITIVE FABRICATION AND RELATED METHODS AND COMPOSITIONS

CROSS-REFERENCE TO RELATED APPLICATIONS

The present application claims the benefit under 35 U.S.C. § 119 (e) of U.S. Provisional Patent Application No. 63/291,715, filed Dec. 20, 2021, titled "Polymer-Synthesizing Binder Compositions for Additive Fabrication and Related Methods and Compositions," which is hereby incorporated by reference in its entirety.

TECHNICAL FIELD

Methods of additive manufacturing, binder compositions for additive manufacturing, and articles produced by and/or associated with methods of additive manufacturing are generally described.

BACKGROUND

Additive manufacturing may be employed to form structures, such as three-dimensional structures. Some methods of additive manufacturing involve employing a binder composition to adhere together a metal powder. However, these methods of additive manufacturing typically suffer from a number of drawbacks. Examples of such drawbacks include undesirable chemical interactions between the binder composition and the metal powder, poor mechanical integrity of metal-based composite objects fabricated from the binder composition, limited shelf stability of the binder composition, and/or the binder composition having a chemical composition unsuitable for being deposited by a print head. Accordingly, improved methods of additive manufacturing, binder compositions for additive manufacturing, and articles produced by and/or associated with methods of additive manufacturing are needed.

SUMMARY

According to some aspects, a method of additive manufacturing is provided comprising forming ones or more parts by performing, a plurality of times, depositing a layer of metal powder, wherein particles of the metal powder are coated with a first material; and depositing a binder composition on at least a portion of the layer of metal powder, the binder composition comprising a second material, and curing the metal powder and binder composition, wherein said curing causes the first material to react with the second material and thereby form a polymer.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 3A shows a non-limiting embodiment of a method of depositing a binder composition onto at least a portion of a layer of metal powder, in accordance with some embodiments;

FIG. 3B shows a non-limiting embodiment of a method step of depositing a second powder layer on a first powder layer onto which a binder composition had been deposited, in accordance with some embodiments;

DETAILED DESCRIPTION

Figure 1A:
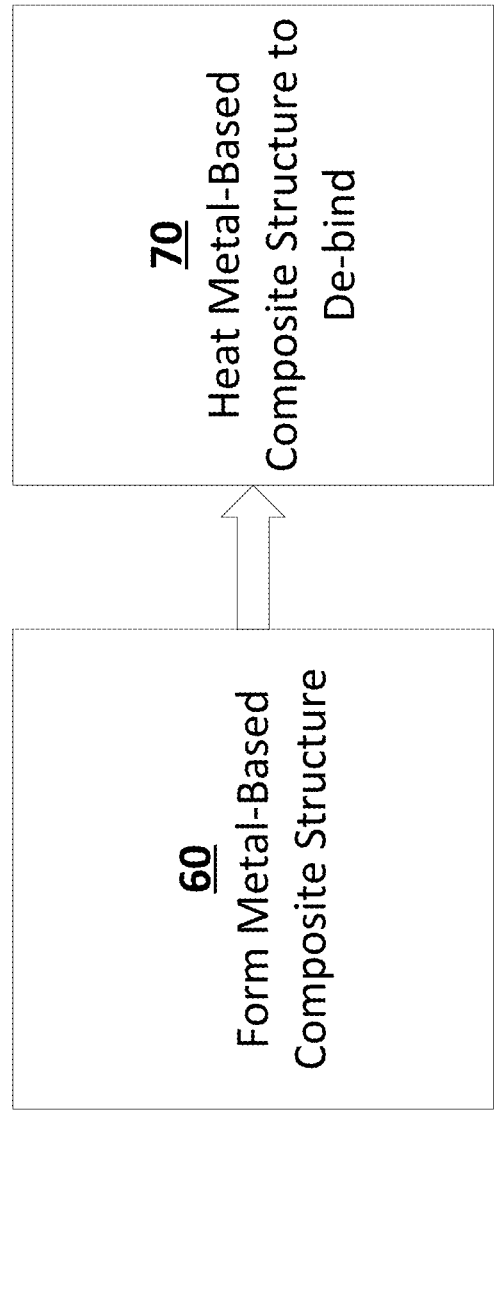
FIGS. 1A-1B show non-limiting diagrams of methods of additive manufacturing, in accordance with some embodiments.

As discussed above, some conventional metallic additive fabrication techniques may apply energy to a metal powder to melt the powder and thereby create solid regions of metal. Such techniques may, however, present safety concerns due to the explosive potential of metal powders. As a result, such techniques are generally employed in inert environments requiring a great deal of associated infrastructure. Moreover, the energy required to melt metal is comparatively high, leading to a slow and expensive fabrication process.

Another additive fabrication technology suitable for fabricating metal parts is Binder Jetting, in which metal parts are fabricated through the application of an organic binder to a bed of metal powder. The binder contains an organic component in a solvent, and the solvent is subsequently removed through vaporization. The organic binder component that remains allows the part geometry to be built up without locally melting the metal by effectively "gluing" particles of metal powder together. Subsequently, the resulting 'green' part is cured to increase the strength of the part (e.g., through cross-linking or steric binding or hinderance of the organic binder component), and is then sintered in a furnace to produce a fully dense metal part.

The inventors have recognized and appreciated techniques for fabricating sinterable metallic parts by coating a metal powder with a first material, and by depositing a binder composition that contains a second material onto the metal powder, then causing the first and second materials to react to form a polymer. The first and second materials may be selected so that they combine to produce a desired polymer. The binder composition may be deposited using conventional binder jetting techniques.

The described techniques are novel in that most binder compositions contain polymers rather than polymer precursors, limiting their loadings in the binder fluid to viscosities that can be jetted by the inkjet printhead. Also, the poor solubility of some polymer in inkjet-friendly solvents may have limited use as a general inkjet binder material in additive fabrication. As a result, the techniques described herein may allow for the use of a particular polymer as a binder that could not otherwise be successfully used as a binder. For instance, polyethyleterphthalate (PET) is not readily dissolvable so cannot be effectively used as a polymer in a binder composition that is jetted from a printhead. However, by coating the metal powder in dimethyl terephthalate and including polyethylene glycol in the binder composition, these materials may react to produce PET when the binder material is applied to the coated metal powder. Moreover, if PET were supplied along with metal powder in the print bed, any binder compositions that were jetted onto the print bed would not be able to form a solution with the PET. As a result, conventional techniques simply would not allow the use of PET as a binder in a binder jet system.

According to some embodiments, the first material may include a monomer, which may for instance include an aliphatic diester or an aromatic diester. According to some embodiments, the second material may include a diol or a polyol. In the description below, reference is made to the first material—being a material that at least partially coats a metal powder—and to the second material—being a material that is one component of a binder composition that is deposited onto the metal powder.

According to some embodiments, the first material may be solid at room temperature (e.g., solid at between 20° C. and 30° C.). To coat the metal powder, the metal powder may be blended with the first material at a temperature at which the first material melts (e.g., around 130° C. for a diester). Since the molten first material may have a low surface tension, it will effectively coat the powder in a thin layer. The temperature is then reduced, solidifying the first material as a thin film on the metal powder surface. This hydrophobic coating will provide a barrier to both moisture and oxygen ingress, most likely raising the minimum ignition energy of the powder and leveling the powder cohesion between different lots of metal powder.

According to some embodiments, the metal powder may be coated at least in part with a co-monomer in addition to the first material. In some embodiments, the co-monomer may react with the second material. The co-monomer may for example contain groups such as carboxylic acids, amines and/or thiols, which may provide better metal coordination and improved adhesion.

In some embodiments, a binder composition comprising the second material is configured to interact with a layer of metal powder such that it penetrates the layer of metal powder and/or spreads within the layer of metal powder in a desirable manner. The binder composition may be configured to readily penetrate through the depth of the layer of metal powder, which may assist with adhering the layer of metal powder together and/or may reduce the amount of undesired pores in a metal-based composite structure formed therefrom prior to sintering. In some embodiments, a binder composition is configured to spread laterally to a relatively low extent within a layer of metal powder. As excessive spreading is believed to cause the formation of metal objects that are oversized and/or rough, this property may assist with the formation of metal objects having fine features and/or that are smooth. As another example, in some embodiments, a binder composition as a whole is configured such that it can be printed by an additive manufacturing system in a desirable manner. For instance, the binder composition as a whole may be configured to allow for the formation of droplets of a desired size and/or uniformity by a print head of the additive manufacturing system. Such properties may allow for additive manufacturing system to be capable of facilely printing the binder composition in a manner that results in the formation of desirable metal-based composite structures without appreciable wear and tear of the on-demand printer.

It should be understood that some binder compositions described herein may have all of the above-described advantages, some binder compositions described herein may have a subset of the above-described advantages, and binder compositions described herein may have none of the above-described advantages. Similarly, some binder compositions described herein may have advantages not described above and/or may be desirable for use in a variety of applications for reasons not described above. Particular features of binder compositions that may promote one or more of the above-described advantages are described in further detail below.

Figure 2:
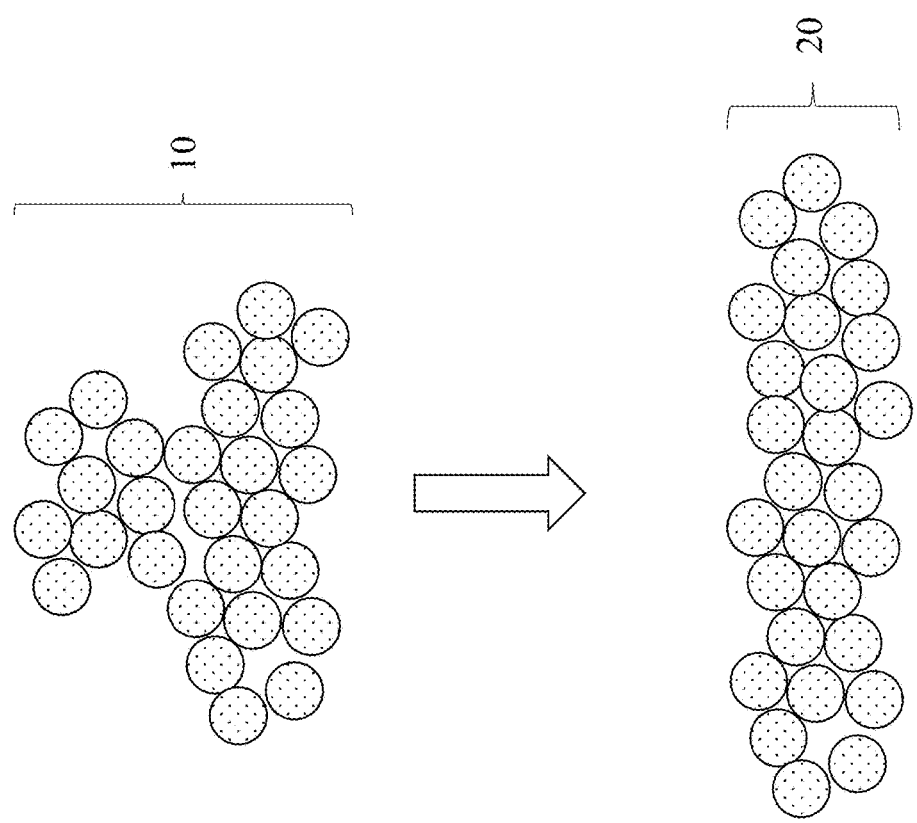
FIG. 2 shows a non-limiting embodiment of a method of depositing a layer of metal powder, in accordance with some embodiments.

In some embodiments, a method of additive manufacturing comprises forming a metal-based composite structure. FIG. 1A shows a non-limiting diagram of additive manufacturing method 50 comprising step 60 in which a metal-based composite structure is formed. Step 60 may comprise one or more sub-steps of depositing a layer of metal powder, depositing a binder composition, and "curing" deposited components via drying and/or cross-linking, according to certain embodiments. For example, step 60 may comprise a step of depositing a layer of metal powder. This step may comprise dispersing a metal powder to form a layer thereof. The metal powder may initially not be in the form of layer (e.g., it may be in the form of a source of metal powder enclosed in a container, in the form of a pile, etc.). FIG. 2 shows one non-limiting embodiment of a method of depositing a layer of metal powder in which a metal powder 10 is deposited to form a layer of metal powder 20. In some embodiments, a metal powder is deposited to form the layer thereof by one or more tools, non-limiting examples of which include rollers, doctor blades, and sifters. Depositing a metal powder to form a layer thereof is typically performed such that the resultant layer of metal powder is formed on a substrate. Appropriate examples of substrates include bases on which the article formed by the additive manufacturing method is designed to be formed (e.g., platforms comprising metals and/or ceramics, sheets comprising metals and/or ceramics) and layers disposed on such bases (e.g., one or more layers of metal powder disposed on a base on which the article formed by the additive manufacturing method is designed to be formed, one or more layers formed in an additive manufacturing process, such as one or more of the layers formed by one or more of the processes described below). Layers disposed on such bases may include layer(s) configured to be incorporated into an article formed by additive manufacturing (e.g., in the case of layer(s) themselves formed by additive manufacturing and/or layer(s) not configured to be incorporated into an article formed by additive manufacturing (e.g., in the case of layer(s) of metal powder).

According to some embodiments, the metal powder 10 may have been previously coated, at least in part, with the first material (e.g., an aliphatic diester or an aromatic diester).

In some embodiments, the metal powder deposited during the formation of the metal-based composite structure in step 60 comprises a noble metal powder and/or a copper (Cu) powder. Certain method steps and/or binder compositions described herein may help overcome challenges associated with additive manufacturing with noble metal and/or copper powders using existing techniques and binders, such as low density of completed metal objects. Referring again to FIG. 2, metal powder 10, which is deposited to form a layer of metal powder 20, is or comprises a copper powder (e.g., comprising copper metal or a copper alloy), a steel powder (e.g., comprising tool steel, 17-4PH stainless, etc.), a noble metal powder (e.g., comprising ruthenium (Ru), rhodium (Rh), palladium (Pd), silver (Ag), osmium (Os), iridium (Ir), platinum (Pt), and/or gold (Au)), a silver powder (e.g., comprising sterling silver), an aluminum or aluminum alloy powder, a titanium or titanium alloy powder, or combinations thereof. In some embodiments, a noble metal powder comprises platinum and/or a platinum alloy (e.g. platinum alloyed with cobalt (Co), ruthenium, iridium). In some instances, a noble metal powder comprises gold metal and/or a gold alloy (e.g., gold alloyed with zinc (Zn), copper, silver, nickel (Ni), iron (Fe), cadmium (Cd), aluminum (Al), palladium (Pd)). In some embodiments in which the metal powder comprises a metal alloy (e.g., a noble metal alloy such as sterling silver), the metal powder comprises a plurality of particles of the metal alloy (e.g., a plurality of sterling silver particles).

Once a layer of metal powder is obtained, the step of forming the metal-based composite structure (e.g., step 60) may further comprise depositing a binder composition comprising the second material onto at least a portion of the layer of metal powder. FIG. 3A shows one example of this method step, as it depicts the deposition of a binder composition 100 on a layer 200 of metal powder. The metal powder comprises a plurality 210 of metal particles. In some embodiments, like the embodiment shown in FIG. 3A, the binder composition are deposited on the metal powder in the form of droplets, such as in the form of a plurality of droplets formed by a print head. By way of example, a method of additive manufacturing described herein may comprise performing a binder jet printing process.

Step 60 of additive manufacturing method 50 may comprise performing the steps shown in FIGS. 2 and 3A multiple times successively. For instance, a method of additive manufacturing may comprise depositing a first layer of metal powder that is at least partially coated with the first material, then depositing a binder composition comprising the second material on at least a portion of the first layer of metal powder, and then depositing a second layer of metal powder that is at least partially coated with the first material on the first layer of metal powder. As another example, a method of additive manufacturing may comprise depositing a binder composition comprising the second material on at least a portion of a first layer of metal powder that is at least partially coated with the first material, then depositing a second layer of metal powder on the first layer of metal powder, and then depositing additional binder composition on at least a portion of the second layer of metal powder. It can be seen that some methods of additive manufacturing may comprise performing these two steps in an alternating manner at least twice, at least three times, at least four times, at least five times, at least ten times, at least a hundred times, or a number of times sufficient to build up a metal-based composite structure.

Methods comprising performing successive steps of depositing a layer of metal powder and depositing a binder composition comprising the second material onto at least a portion of the layer of metal powder may be performed in a variety of manners. By way of example, FIG. 3B shows a method step of depositing a second powder layer 252 on the first powder layer onto which a binder composition had been deposited.

In some embodiments, the sequential steps of depositing a layer of metal powder and depositing a binder composition comprising the second material thereon may be performed in a manner in which the binder deposited on at least a portion of a first layer of metal powder is not dried or cross-linked prior to depositing a second layer of metal powder on the first layer of metal powder (e.g., the second layer of metal powder is deposited on the first layer of metal powder prior to drying or cross-linking the binder composition). The article formed by such successive steps may be referred to elsewhere herein as a "three-dimensional composition," a "green part," or simply a "part." In some embodiments, the sequential steps of depositing a layer of metal powder and depositing a binder composition thereon may be performed in a manner in which the binder composition comprising the second material deposited on at least a portion of a first layer of metal powder is dried and/or cross-linked prior to depositing a second layer of metal powder on the first layer of metal powder. In some such embodiments, drying the binder composition may occur passively at least in part; that is, without a step in which a source of heat is actively applied (examples of applied heating steps being radiative heating (e.g., with an infrared lamp) or convective (e.g., via blowing with hot gas). Passive drying may comprise, for instance, drying at room temperature over some period of time.

It should be noted that some embodiments may comprise both of the above-referenced sequences of steps (e.g., during step 60). For instance, the steps of sequentially depositing a layer of metal powder and then depositing a binder composition comprising the second material onto at least a portion of the layer of metal powder may be repeated a number of times without performing any drying or heating process on the binder composition (e.g., one or more layers of metal powder may be deposited prior to cross-linking or drying the binder composition previously deposited, binder composition may be deposited onto at least a portion of a layer of metal powder deposited prior to the cross-linking or drying of the binder composition previously deposited). These steps may result in the formation of a three-dimensional composition. Then, the binder composition may be dried and/or cross-linked to form a metal-based composite structure from the three-dimensional composition. After which, further steps of sequentially depositing a layer of metal powder and then depositing a binder composition onto at least a portion of the layer of metal powder may be performed thereon. The second three-dimensional composition may also be dried and/or cross-linked. This drying and/or cross-linking may result in the formation of a new metal-based composite structure comprising the prior metal-based composite structure and the dried and/or cross-linked three-dimensional composition formed thereon.

Figure 3C:
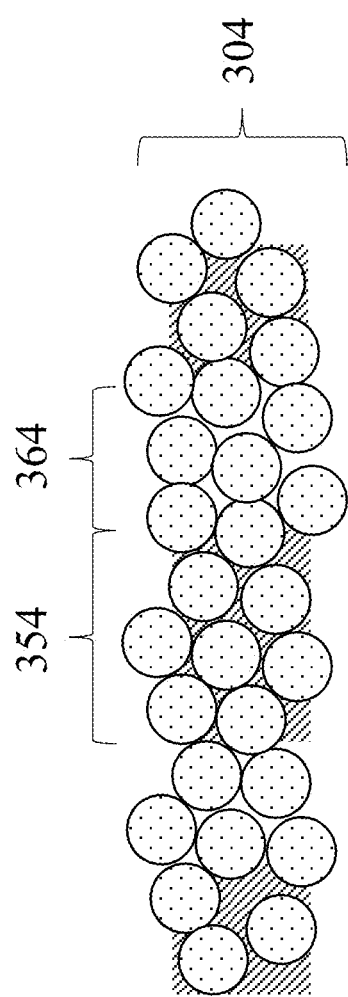
FIG. 3C shows a non-limiting embodiment of a layer onto which a binder composition has been deposited, in accordance with some embodiments.

In some embodiments, a step of depositing a binder composition comprising the second material on at least a portion of a layer of metal powder like that shown in FIG. 3A or FIG. 3B comprises depositing a binder composition comprising the second material on a layer of metal powder such that it contacts some portions of the layer of metal powder and does not contact other portions of the layer of metal powder. The binder composition may penetrate into and/or spread into portions of the layer of metal powder that it contacts. This process may result in the formation of a layer having a morphology like that shown in FIG. 3C. In FIG. 3C, a layer 304 comprises a portion 354 comprising a binder composition comprising the second material, a portion of the layer of metal powder, and a portion 364 comprising a portion of the layer of metal powder but lacking the binder composition. The portions of the layer of metal powder through which the binder composition has penetrated and/or spread may be adhered together by one or more components of the binder composition (e.g., a polymer) upon deposition thereof and/or during later processing steps. The portions of the layer of metal powder through which the binder composition has not penetrated or spread may remain unadhered to each other.

During formation of a three-dimensional composition, deposition of a binder composition comprising the second material on a layer or metal powder may also comprise depositing a portion of the binder composition onto another layer positioned beneath the layer (e.g., binder composition is deposited on a second layer and a first layer beneath the second layer). Advantageously, this may adhere together layers in the three-dimensional composition with the layers to which they are directly adjacent, which may result in the formation of a three-dimensional object, metal-based composite structure, or combination of metal-based composite structures adhered together in all three dimensions and/or having a continuous morphology.

As described above, some methods of additive manufacturing comprise forming a metal-based composite structure (e.g., from a layer comprising a binder composition comprising the second material, from a three-dimensional composition) (e.g., in a process comprising drying and/or cross-linking a binder composition). The metal-based structure may comprise a metal powder comprising a noble metal powder and/or a copper metal powder. As also described above, the binder composition comprising one or more the second material may be a binder composition present in a three-dimensional composition and/or may be a binder composition present in a layer disposed on a metal-based composite structure.

As mentioned above, step 60 of additive manufacturing method 50, corresponding to forming a metal-based composite structure, may comprise a step of drying and/or cross-linking the binder composition comprising the second material (e.g., to "cure" the metal-based composite structure). Drying the binder composition may comprise exposing the binder composition to a stimulus that causes one or more volatile components therein to evaporate (e.g., free water, organic solvents, volatile pH modifiers). Other, non-volatile and/or less volatile components of the binder composition may not be removed by a drying process (e.g., bound water, a polymer, a cross-linking agent).

Cross-linking the binder composition comprising the second material comprise exposing the binder composition to a stimulus that causes one or more portions thereof to undergo a cross-linking reaction (e.g., a polymer, a cross-linking agent). Non-limiting examples of suitable stimuli include heat and light (e.g., microwave radiation, UV light). As such, in some embodiments, step 60 includes a heating step. Heat transfer during the heating step may include any combination of conduction, convection and/or radiation. Convective heat transfer may include, but is not limited to, forced convection through the powder bed. Heat and/or light stimuli may be suitable both for drying the binder composition and cross-linking the binder composition; other such stimuli may only be suitable for one or the other. In some embodiments, a binder composition may be dried and then cross-linked. The drying step may comprise removing one or more components that would interfere with the cross-linking step. For instance, a drying step may comprise removing water (e.g., water that causes the equilibrium of the cross-linking reaction to favor breaking cross-links instead of forming cross-links) and/or may comprise removing an optional pH modifier, if present (e.g., a pH modifier that would interfere with the cross-linking reaction).

Additionally, or alternatively to drying and/or cross-linking, forming a metal-based composite structure in step 60 may comprise heating of the metal powder and binder composition to cause the first material to react with (e.g., esterifies) the second material to form a polymer. One or more gases may, for instance, be generated as a by-product of this reaction (e.g., forming PET while producing methanol as a by-product).

According to some embodiments, this reaction may be accelerated with the addition of a catalyst such as antimony oxide, titanium dioxide or a variety of other catalysts. Some metal powders, such as titanium, may possess a surface oxide coating as high as 1000 ppm oxygen on its surface, and as such the metal powder may very well catalyze the polymerization reaction without the need of independent catalyst addition.

In some embodiments, heating of the metal powder and binder composition to cause the first material to react with (e.g., esterify) the second material to form a polymer comprises heating an environment in which a three-dimensional composition is positioned to a temperature of greater than or equal to 90° C., greater than or equal to 100° C., greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., greater than or equal to 200° C., greater than or equal to 210° C., greater than or equal to 220° C., greater than or equal to 230° C., or greater than or equal to 240° C. In some embodiments, heating of the metal powder and binder composition to cause the first material to react with the second material to form a polymer comprises heating an environment in which the three-dimensional composition is positioned to a temperature of less than or equal to 250° C., less than or equal to 240° C., less than or equal to 230° C., less than or equal to 220° C., less than or equal to 210° C., less than or equal to 200° C., less than or equal to 190° C., less than or equal to 180° C., less than or equal to 170° C., less than or equal to 160° C., less than or equal to 150° C., less than or equal to 140° C., less than or equal to 130° C., less than or equal to 120° C., or less than or equal to 100° C. Combinations of the above-referenced ranges are also possible (e.g., greater than or equal to 90° C. and less than or equal to 250° C., greater than or equal to 120° C. and less than or equal to 220° C.). Other temperatures are also possible. The temperature chosen for the environment during the heating may in some cases depend on the composition of the environment. The temperature of an environment may be determined by use of a thermocouple positioned in the environment.

Figure 4:
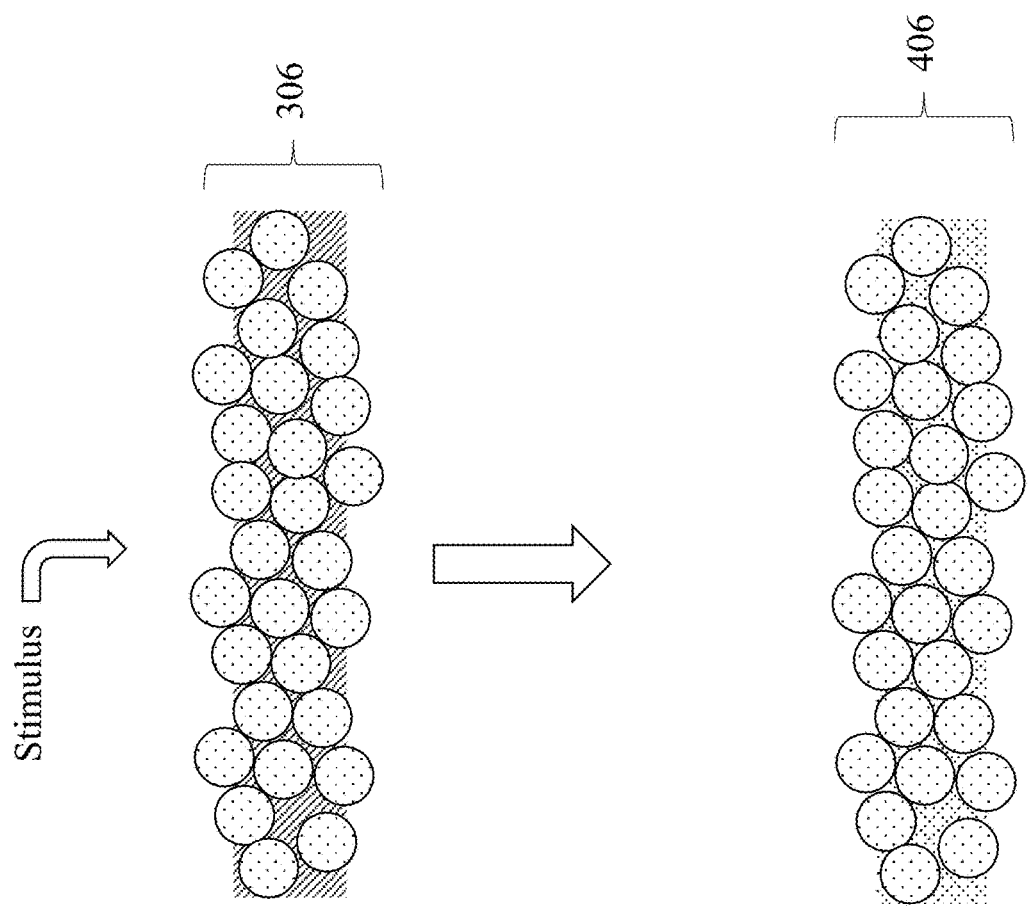
FIG. 4 shows one non-limiting embodiment of a method of drying and/or cross-linking a binder composition, in accordance with some embodiments.

FIG. 4 shows one example of a step of drying, heating and/or cross-linking a binder composition, in which a stimulus is applied to a layer 306 to form a metal-based composite structure 406. In some embodiments, a method like that shown in FIG. 4 is performed on a single layer comprising a layer of metal particles and a binder (and/or a layer of metal particles on which a binder composition is disposed). In some embodiments, a method like that shown in FIG. 4 is performed on a series of such layers disposed on each other in a three-dimensional composition simultaneously.

In some embodiments, a metal-based composite structure may undergo one or more further steps. By way of example, portion(s) of a layer of metal powder (and/or layers of metal powder forming a metal powder bed) onto which the binder composition comprising the second material has been deposited may be incorporated into the metal-based composite structure while other portion(s) (e.g., portions onto which the binder composition was not deposited) may not be incorporated into the metal-based composite structure. One or more portion(s) of the layer(s) of metal powder and/or metal powder bed not incorporated into the metal-based composite structure may be removed therefrom (e.g., following step 60 in FIG. 1A). This may be accomplished by, for example, removing the metal-based composite structure from a powder bed. Removing the metal powder not incorporated into the metal-based composite structure may include a "depowdering" process. A depowdering process may be accomplished using any of a variety of techniques, including, but not limited to, manual removal (e.g., by brushing excess powder), directed gas stream flow, and collision with solid particles (e.g., particles of solid $CO_2$) to dislodge unincorporated metal powder from the metal-based composite structure.

In some embodiments, the additive manufacturing method includes a step of heating the metal-based composite structure. For example, following step 60 in which the metal-based composite structure is formed, subsequently step 70 may be performed, in which the metal-based composite structure is heated. Heating in step 70 may be performed to debind the metal-based composite structure and/or to react the first material with the second material. Reacting the first material with the second material may be in addition to a previous reaction that took place in act 60, as described above.

It should be understood that one or more intervening steps may be performed between step 60 and step 70, such as the depowdering step described above. While the heating to de-bind of step 70 is optional, it may, in certain cases, be useful for removing some or all of the binder from the metal-based composite structure. Removal of the binder (e.g., in step 70) may, in some cases, advantageously contribute to high metal densities in the finished product of the additive manufacturing method.

Figure 5:
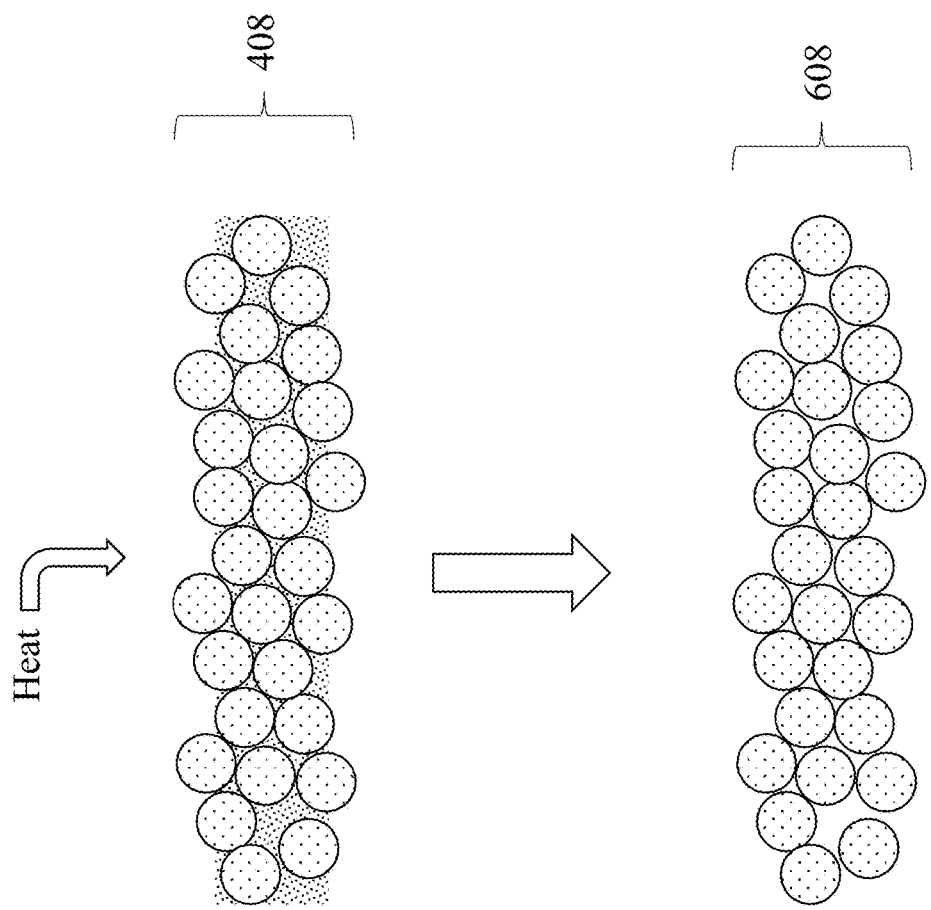
FIG. 5 shows one non-limiting embodiment of a method of heating a metal-based composite structure, in accordance with some embodiments.

The heating (e.g., in step 70) may comprise positioning the metal-based composite structure in an environment at a temperature that results in the removal of one or more components of the binder composition previously retained in the composite structure. For instance, the heating may remove a polymer from the binder composition retained in the composite structure and/or one or more other components of the binder composition not removed from the composite structure by prior drying and/or cross-linking steps. In some embodiments, heating the composite structure may cause thermal decomposition of these components of the binder composition that are then volatilized or retained as solids (e.g., as char) positioned within the resultant structure. The resultant structure may also be referred to herein as a "de-bound metal structure". FIG. 5 shows one example of a heating step, in which heat is applied to a metal-based composite structure 408 to form a de-bound metal structure 608. During a heating step, the particles present in the metal-based composite structure may adhere together directly as the portion(s) of the binder composition are being removed.

During this heating process (e.g., during step 70), a temperature is typically selected that promotes volatilization (e.g., evaporation, thermal decomposition and/or degradation) of the binder and/or binder composition. However, in some cases the temperature should not be so high as to cause deleterious processes such as oxide formation when certain metals are present. In some embodiments, an environment in which a metal-based composite structure is positioned is heated to a temperature of greater than or equal to 220° C., greater than or equal to 230° C., greater than or equal to 240° C., greater than or equal to 250° C., greater than or equal to 275° C., greater than or equal to 300° C., greater than or equal to 350° C., greater than or equal to 400° C., or greater than or equal to 450° C. In some embodiments, an environment in which a metal-based composite structure is positioned is heated to a temperature of less than or equal to 450° C., less than or equal to 400° C., less than or equal to 350° C., less than or equal to 300° C., less than or equal to 280° C., less than or equal to 275° C., less than or equal to 250° C., less than or equal to 240° C., or less than or equal to 230° C. Combinations of the above-referenced ranges are also possible (e.g., greater than or equal to 220° C. and less than or equal to 450° C., or greater than or equal to 240° C. and less than or equal to 280° C.). Other ranges are also possible. The temperature of an environment may be determined by use of a thermocouple positioned in the environment.

It should be understood that some heating steps may comprise heating an environment in which the metal-based composite structure is positioned to two or more temperatures in sequence. For instance, a heating step may comprise heating a metal-based composite structure at one temperature at which one portion of the binder is expected to degrade (e.g., based on a thermogravimetric analysis performed on the binder) and then heating the metal-based composite structure at another temperature at which another portion of the binder is expected to degrade (e.g., based on a thermogravimetric analysis performed on the binder). These temperatures may be successively increasing (e.g., each temperature to which the metal-based composite structure is heated during the heating step may be higher than the previous temperature at which the metal-based composite structure was heated during the heating step). Some such heating steps may comprise heating the metal-based composite structure at three, four, five, or even more temperatures in sequence. Some or all of the temperatures may be within one or more of the above-described ranges.

In some embodiments, a heating step (e.g., during step 70) is performed in a manner that reduces the tendency of the metal-based composite structure to form cracks. For instance, the heating step may be performed in a manner such that changes between temperatures are accomplished relatively slowly. In some embodiments, a heating step is performed such that the change in temperature of the environment in which the metal-based composite structure is positioned is less than or equal to 2° C./min, less than or equal to 1.5° C./min, less than or equal to 1° C./min, less than or equal to 0.75° C./min, less than or equal to 0.5° C./min, or less than or equal to 0.25° C./min. In some embodiments, a heating step is performed such that that the change in temperature of the environment in which the metal-based composite structure is positioned is greater than or equal to 0.1° C./min, greater than or equal to 0.25° C./min, greater than or equal to 0.5° C./min, greater than or equal to 0.75° C./min, greater than or equal to 1° C./min, or greater than or equal to 1.5° C./min. Combinations of the above-referenced ranges are also possible (e.g., greater than or equal to 2° C./min and less than or equal to 0.1° C./min). Other ranges are also possible. In some embodiments, the temperature of the environment in which the metal-based composite structure is positioned is either constant or changes at a rate in one or more of the ranges described above throughout the heating step. In some embodiments, the heating step comprises a change in temperature at a rate in one or more of the ranges described above but also comprises further changes in temperature (e.g., at a rate in one or more of the ranges described above, at a rate outside of the ranges described above).

In some embodiments, during a heating step (e.g., step 70 in FIG. 1A), the pressure of the environment to which the metal-based composite structure is exposed is set to a partial vacuum to contribute to the removal of the decomposition products from the metal-based composite structure. It should be understood that in a partial vacuum, one or more gases may be present, but the environment has a pressure lower than ambient pressure. In some embodiments, the pressure of the environment is greater than or equal to 105 bar, greater than or equal to 104 bar, greater than or equal to $10^{-3}$ bar, greater than or equal to 10" 2 bar, greater than or equal to $10^{-1}$ bar, greater than or equal to 1 bar, greater than or equal to 10 bar, greater than or equal to 20 bar, or greater than or equal to 50 bar. In some embodiments, the pressure is less than or equal to 70 bar, less than or equal to 50 bar, less than or equal to 20 bar, less than or equal to 10 bar, less than or equal to 1 bar, less than or equal to $10^{-1}$ bar, less than or equal to $10^{-2}$ bar, less than or equal to 103 bar, less than or equal to 104 bar, less than or equal to 105 bar, less than or equal to $10^{-6}$ bar, less than or equal to $10^{-7}$ bar, less than or equal to $10^{-8}$ bar, less than or equal to $10^{-9}$ bar, or less than or equal to 10-10 bar. Combinations of the above-referenced ranges are also possible (e.g., greater than or equal to 10-11 bar and less than or equal to 70 bar, greater than or equal to 10" 11 bar and less than or equal to $10^{-3}$ bar, greater than or equal to $10^{-3}$ bar and less than or equal to 70 bar, greater than or equal to $10^{-3}$ bar and less than or equal to 1 bar, or greater than or equal to $10^{-3}$ bar and less than or equal to $10^{-1}$ bar). Other ranges are also possible. The pressure may be determined by a pressure gauge. In some embodiments, the pressure of the environment to which the metal-based composite structure is exposed is cycled between atmospheric pressure and a pressure in one or more of the above-referenced ranges.

In some embodiments, an environment to which a metal-based composite structure is exposed during a heating step is a gaseous environment, where the environment comprises one or more gases. For instance, in some embodiments, the relevant environment may comprise one or more species that are reactive (e.g., with one or more components of the binder) at the temperature to which the environment is heated. For example, the relevant environment may be an oxidative environment (e.g., it may comprise air). An oxidative environment generally refers to one comprising oxidizing species, including but not limited to oxygen gas ($O_2$), ozone ($O_3$), gaseous hydrogen peroxide ($H_2O_2$), other peroxides (e.g., sodium peroxide ($Na_2O_2$), barium peroxide ($BaO_2$), magnesium peroxide ($MgO_2$), gaseous nitric acid ($HNO_3$), and carbon dioxide ($CO_2$). It has been unexpectedly observed in the context of the present disclosure that the use of an oxidative environment during a thermal de-binding step (i.e., involving a heating step) can lead to effective de-binding of metal-based composites formed from noble metal and/or copper powder while reducing or avoiding of typical deleterious phenomena, such as copper oxide formation in the case of sterling silver. The formation of such oxides may cause a loss of density of the finished metal object of the overall additive manufacturing method.

In some embodiments in which the environment in which a metal-based composite structure is heated in an oxidative environment, the environment is a gaseous environment having a suitable oxygen ($O_2$) content. For example, in some embodiments, an oxidative environment in which a metal-based composite structure is heated has an oxygen content of greater than or equal to 10%, greater than or equal to 12%, greater than or equal to 15%, greater than or equal to 18%, greater than or equal to 20% by volume, greater than or equal to 30%, greater than or equal to 50%, greater than or equal to 75%, or greater. In some cases, an oxidative environment in which a metal-based composite structure is heated has an oxygen content of less than or equal to 100%, less than or equal to 90%, less than or equal to 75%, less than or equal to 60%, less than or equal to 50%, less than or equal to 40%, less than or equal to 30%, less than or equal to 25%, less than or equal to 23%, less than or equal to 22%, less than or equal to 21%, less than or equal to 20%, less than or equal to 18%, less than or equal to 15%, or less than or equal to 10% by volume. Combinations of these ranges are possible. For example, in some embodiments, an oxidative environment in which a metal-based composite structure is heated has an oxygen content of greater than or equal to 10% and less than or equal to 100% or greater than or equal to 10% and less than or equal to 23% by volume. In some embodiments, the oxidative environment is a gaseous environment that is or comprises air.

In some embodiments in which the environment in which a metal-based composite structure is heated in an oxidative environment, the environment is a gaseous environment having oxygen ($O_2$) at a suitable partial pressure. For example, in some embodiments, an oxidative environment in which a metal-based composite structure is heated has an oxygen partial pressure of greater than or equal to $10^{-5}$ bar, greater than or equal to $10^{-4}$ bar, greater than or equal to $10^{-3}$ bar, greater than or equal to $10^{-2}$ bar, greater than or equal to $10^{-1}$ bar, $2 \times 10^{-1}$ bar, greater than or equal to 1 bar, greater than or equal to 10 bar, greater than or equal to 20 bar, or greater than or equal to 50 bar. In some cases, an oxidative environment in which a metal-based composite structure is heated has an oxygen partial pressure of less than or equal to 70 bar, less than or equal to 50 bar, less than or equal to 20 bar, less than or equal to 10 bar, less than or equal to 1 bar, less than or equal to $2 \times 10^{-1}$ bar, less than or equal to $10^{-1}$ bar, less than or equal to $10^{-2}$ bar, less than or equal to $10^{-3}$ bar, or less than or equal to $10^{-4}$ bar. Combinations of these ranges are possible. For example, in some embodiments, an oxidative environment in which a metal-based composite structure is heated has an oxygen partial pressure of greater than or equal to $10^{-5}$ bar and less than or equal to 70 bar.

In some instances, step 70 further comprises a step of exposing the resulting de-bound metal structure to a reductive environment (e.g., following a heating step in which the metal-based composite is exposed to an oxidative environment). The reductive environment may comprise hydrogen ($H_2$). For instance, in some embodiments, a reductive environment in which a de-bound metal structure is heated after the oxidative de-debinding is a gaseous environment having a hydrogen content of greater than or equal to 2 vol %, greater than or equal to 4 vol %, greater than or equal to 6 vol %, greater than or equal to 8 vol %, greater than or equal to 10 vol %, greater than or equal to 20 vol %, greater than or equal to 30 vol %, greater than or equal to 50 vol %, greater than or equal to 75 vol %, greater than or equal to 90 vol %, greater than or equal to 95 vol %, or higher. The reductive gaseous environment in which the de-bound metal structure is heated may have a hydrogen content of less than or equal to 100 vol %, less than or equal to 99 vol %, less than or equal to 95 vol %, less than or equal to 90 vol %, less than or equal to 75 vol %, less than or equal to 50 vol %, less than or equal to 40 vol %, less than or equal to 30 vol %, less than or equal to 20 vol %, less than or equal to 10 vol %, less than or equal to 8 vol %, less than or equal to 6 vol %, or less than or equal to 4 vol % hydrogen. Combinations of the above-referenced ranges are also possible (e.g., a hydrogen content of greater than or equal to 2 vol % and less than or equal to 100 vol %, or a hydrogen content of greater than or equal to 2 vol % and less than or equal to 10 vol %). Other ranges are also possible.

In some embodiments, a reductive gaseous environment in which a de-bound metal structure is heated after the oxidative de-debinding has a partial pressure of hydrogen of greater than or equal to $10^{-5}$ bar, greater than or equal to $10^{-4}$ bar, greater than or equal to $10^{-3}$ bar, greater than or equal to $10^{-2}$ bar, greater than or equal to $10^{-1}$ bar, greater than or equal to 1 bar, greater than or equal to 10 bar, greater than or equal to 20 bar, or greater than or equal to 50 bar. In some embodiments, a reductive gaseous environment in which a de-bound metal structure is heated after the oxidative de-debinding has a partial pressure of hydrogen of less than or equal to 70 bar, less than or equal to 50 bar, less than or equal to 20 bar, less than or equal to 10 bar, less than or equal to 1 bar,, less than or equal to $10^{-1}$ bar, less than or equal to $10^{-2}$ bar, less than or equal to $10^{-3}$ bar, or less than or equal to 104 bar. Combinations of these ranges (e.g., greater than or equal to $10^{-5}$ bar hydrogen and less than or equal to 70 bar hydrogen) are possible.

As one non-limiting example, a metal-based composite structure may be heated as part of a de-binding step in an oxidative gaseous environment (e.g., air) having a temperature of greater than or equal to 220° C. and less than or equal to 450° C. to form a de-bound metal structure, and then the environment may be changed a second environment that is a reductive gaseous environment (e.g., having a hydrogen content of greater than or equal to 2 vol % and up to 10 vol %, or even up to 100 vol % hydrogen) having a temperature that is also of greater than or equal to 220° C. and less than or equal to 450° C. The de-bound metal structure may be held in the second environment for greater than or equal to 1 hour and less than or equal to 6 hours, for example.

A metal-based composite structure may be heated (e.g., in an oxidative environment) for a variety of suitable amounts of time. In some embodiments, an environment in which a metal-based composite material is positioned (e.g., an oxidative environment) is heated for a time period of greater than or equal to 15 minutes, greater than or equal to 0.5 hours, greater than or equal to 1 hour, greater than or equal to 1.5 hours, greater than or equal to 2 hours, greater than or equal to 2.5 hours, greater than or equal to 3 hours, greater than or equal to 4 hours, greater than or equal to 4.5 hours, greater than or equal to 5 hours, greater than or equal to 5.5 hours, greater than or equal to 6 hours, greater than or equal to 6.5 hours, greater than or equal to 7 hours, greater than or equal to 7.5 hours, greater than or equal to 8 hours, greater than or equal to 8.5 hours, greater than or equal to 9 hours, greater than or equal to 9.5 hours, greater than or equal to 10 hours, greater than or equal to 15 hours, greater than or equal to 20 hours, or greater. In some embodiments, an environment in which a metal-based composite material is positioned is heated for a time period of less than or equal to 72 hours, less than or equal to 48 hours, less than or equal to 36 hours, less than or equal to 24 hours, less than or equal to 20 hours, less than or equal to 15 hours, less than or equal to 10 hours, less than or equal to 9.5 hours, less than or equal to 9 hours, less than or equal to 8.5 hours, less than or equal to 8 hours, less than or equal to 7.5 hours, less than or equal to 7 hours, less than or equal to 6.5 hours, less than or equal to 6 hours, less than or equal to 5.5 hours, or less than or equal to 5 hours. Combinations of the above-referenced ranges are also possible (e.g., greater than or equal to 15 minutes and less than or equal to 1 day, or greater than or equal to 4 hours and less than or equal to 10 hours). Other ranges are also possible.

In some embodiments, heating a metal-based composite material comprises heating the environment in which the metal-based composite material is positioned to one temperature in one or more of the above-referenced ranges and holding the temperature of the environment thereat for an amount of time in one of the above-referenced ranges. In some embodiments, heating a metal-based composite material comprises heating an environment in which the metal-based composite is positioned to two or more temperatures in the above-referenced ranges sequentially and holding the temperature of the environment at each of the two or more temperatures. In such embodiments, the relevant environment may be held at each of the relevant temperatures for a period of time in one or more of the above-referenced ranges and/or may be heated such that the total time it is held at all of the relevant temperatures is in one or more of the above-referenced ranges.

Non-limiting examples of suitable environments in which a metal-based composite structure may be positioned during heating include suitable chambers such as an oven.

In some embodiments where the additive manufacturing method comprises heating a metal-based composite structure in a first, oxidative environment in a chamber (e.g., oven) to de-bind the metal-based composite structure and then comprises holding the resulting de-bound metal structure in a second environment (e.g., a reductive gaseous environment), the holding step can also be performed in the same chamber as the first, oxidative environment. For example, the oxidizing gas of the first environment may be replaced with a reducing gas (e.g., hydrogen) by flowing in a reducing gas, or evacuating the chamber and back-filling with the reducing gas.

Figure 1B:
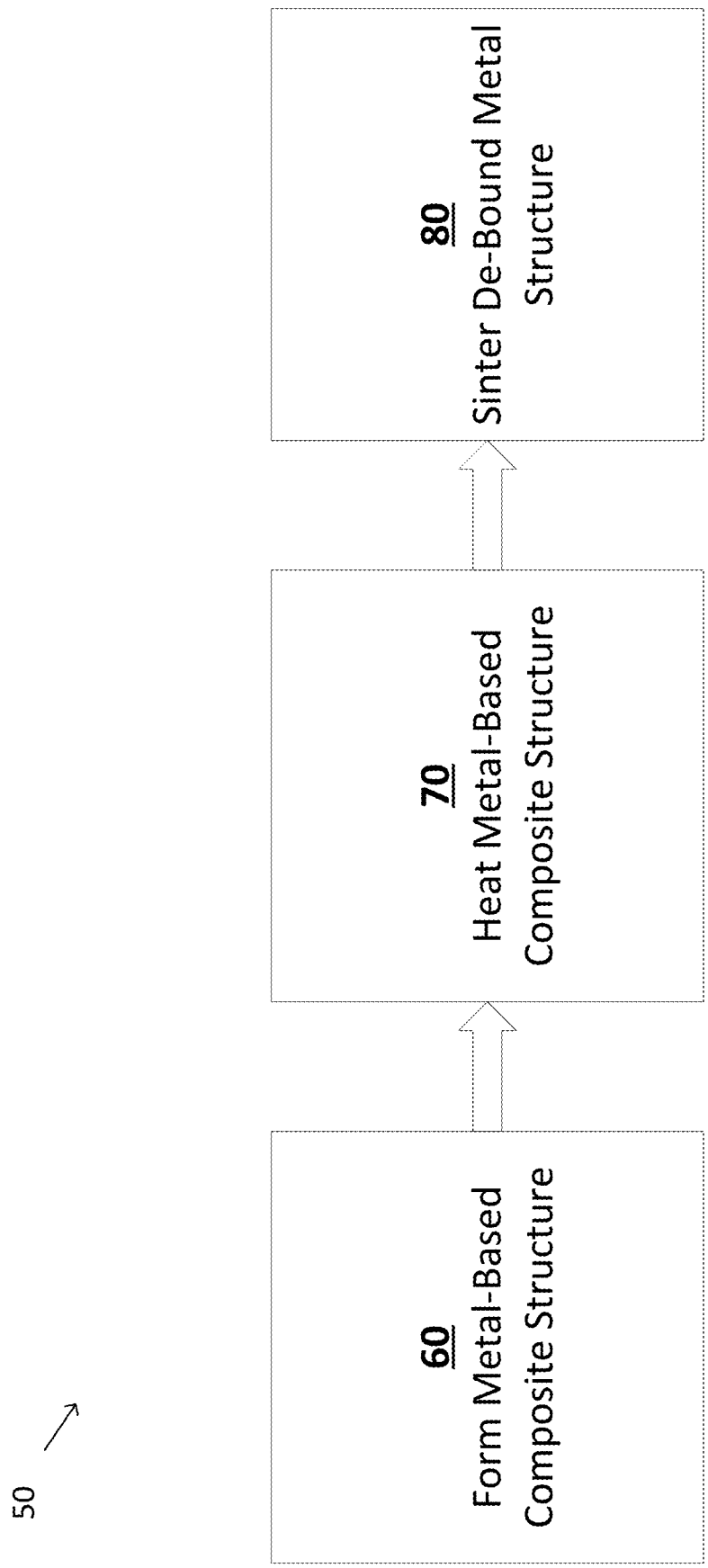
Figure 6:
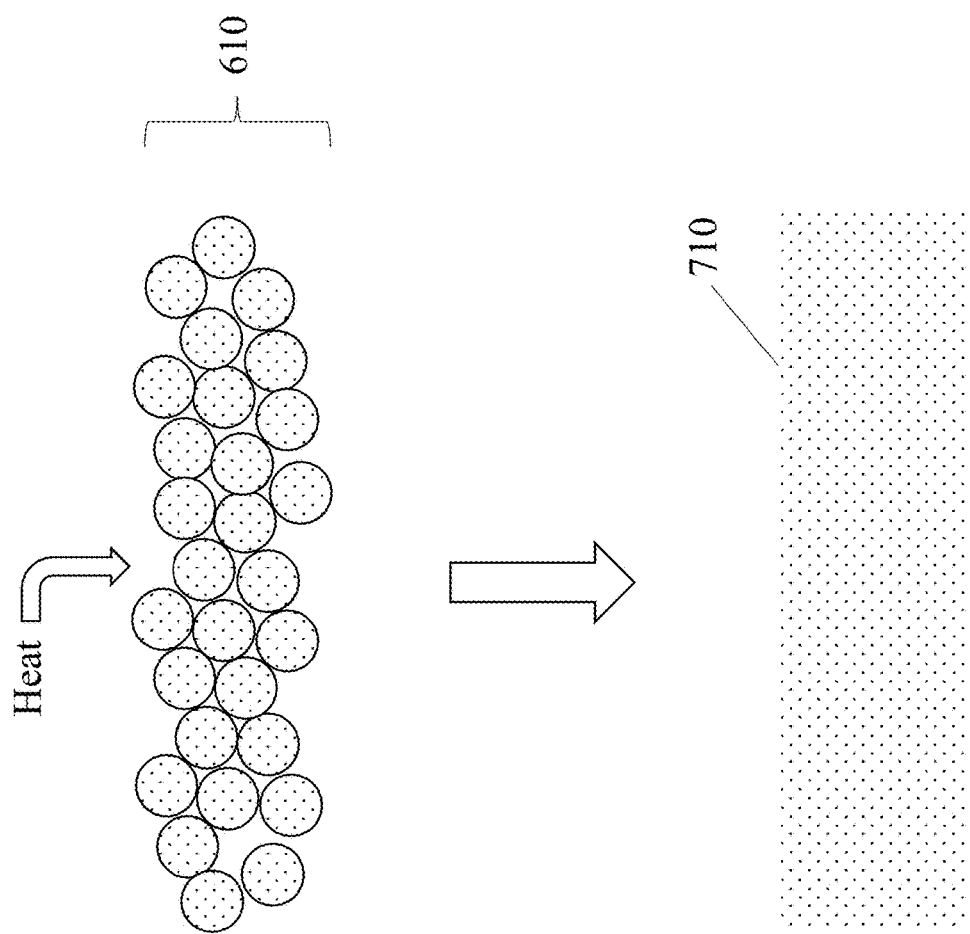
FIG. 6 shows one non-limiting embodiment of a method of heating a de-bound metal structure, in accordance with some embodiments.

In some embodiments, the additive manufacturing method includes a step of sintering the de-bound metal structure to form a metal object. For example, FIG. 1B shows an exemplary embodiment of additive manufacturing method 50 in which a step 80 of sintering a de-bound metal structure is performed following step 60 and step 70. The sintering step may be performed by heating the de-bound metal structure. In some embodiments, sintering the de-bound metal structure (e.g., by heating) forms a metal object. The heating process of the sintering step (e.g., step 80) may comprise heating an environment in which the de-bound metal structure is positioned to a temperature that allows for diffusion of metal components within the de-bound metal structure but that does not melt the de-bound metal structure to an undesirable extent. For example, this heating step may comprise heating the environment to a temperature that promotes sintering of the de-bound metal structure. Advantageously, diffusion that occurs during sintering may further bond together the resultant metal object and/or may reduce (and/or eliminate) any porosity present in de-bound metal structure. This diffusion may also cause de-bound metal structure to densify, which may enhance its surface finish, mechanical properties, and/or electrical conductivity. FIG. 6 shows one example of a step of heating a de-bound metal structure, in which heat is applied to a de-bound metal structure 610 to form a metal object 710.

The temperature of the environment in which the sintering step is performed may be chosen based on one or more properties of the metal and/or metal alloy (e.g., copper or a noble metal such as silver, platinum, gold) present in the de-bound metal structure. For example, during this heating process, it may be desirable for the de-bound metal structure to undergo sintering without undergoing appreciable melting, and an appropriate temperature should be chosen accordingly. Heating may be performed using any of a variety of techniques, such as radiative heating, convective heating, conduction, or combinations thereof. For example, in some embodiments, the sintering is performed in a thermal radiation oven. In certain other embodiments, the sintering is performed in an oven configured to reach relatively high temperatures, such as a tube furnace. In some embodiments, an environment in which a de-bound metal structure is positioned is heated to a temperature of greater than or equal to 750° C., greater than or equal to 800° C., greater than or equal to 850° C., greater than or equal to 900° C., greater than or equal to 950° C., greater than or equal to 1000° C., greater than or equal to 1050° C., greater than or equal to 1100° C., greater than or equal to 1150° C., greater than or equal to 1200° C., greater than or equal to 1250° C., greater than or equal to 1300° C., greater than or equal to 1350° C., greater than or equal to 1400° C., greater than or equal to 1500° C., or greater than or equal to 1600° C. In some embodiments, an environment in which a de-bound metal structure is positioned is heated to a temperature of less than or equal to 1700° C., less than or equal to 1600° C., less than or equal to 1500° C., less than or equal to 1400° C., less than or equal to 1350° C., less than or equal to 1300° C., less than or equal to 1250° C., less than or equal to 1200° C., less than or equal to 1150° C., less than or equal to 1100° C., less than or equal to 1050° C., less than or equal to 1000° C., less than or equal to 950° C., less than or equal to 900° C., less than or equal to 850° C., or less than or equal to 800° C. Combinations of the above-referenced ranges are also possible (e.g., greater than or equal to 750° C. and less than or equal to 1700° C., greater than or equal to 750° C. and less than or equal to 1200° C., greater than or equal to 750° C. and less than or equal to 900° C., greater than or equal to 800° C. and less than or equal to 1000° C., or greater than or equal to 1400° C. and less than or equal to 1700° C.). Other ranges are also possible. The temperature of an environment may be determined by use of a thermocouple positioned in the environment.

In some embodiments, during the heating step of a sintering process (e.g., during step 80 in FIG. 1B), the pressure of the environment to which the de-bound metal structure is exposed is set to a full vacuum or a partial vacuum to contribute to the removal of, for example, decomposition products from the metal-based composite structure that may still be present in the de-bound metal structure. In some embodiments, the pressure is greater than or equal to $10^{-11}$ bar, greater than or equal to $10^{-10}$ bar, greater than or equal to $10^{-9}$ bar, greater than or equal to $10^{-8}$ bar, greater than or equal to $10^{-7}$ bar, greater than or equal to $10^{-6}$ bar, greater than or equal to $10^{-5}$ bar, greater than or equal to 104 bar, greater than or equal to 103 bar, greater than or equal to $10^{-2}$ bar, greater than or equal to $10^{-1}$ bar, greater than or equal to 1 bar, greater than or equal to 10 bar, greater than or equal to 20 bar, or greater than or equal to 50 bar. In some embodiments, the pressure is less than or equal to 70 bar, less than or equal to 50 bar, less than or equal to 20 bar, less than or equal to 10 bar, less than or equal to 1 bar, less than or equal to $10^{-1}$ bar, less than or equal to $10^{-2}$ bar, less than or equal to $10^{-3}$ bar, less than or equal to $10^{-4}$ bar, less than or equal to $10^{-5}$ bar, less than or equal to $10^{-6}$ bar, less than or equal to $10^{-7}$ bar, less than or equal to $10^{-8}$ bar, less than or equal to $10^{-9}$ bar, or less than or equal to $10^{-10}$ bar. Combinations of the above-referenced ranges are also possible (e.g., greater than or equal to $10^{-11}$ bar and less than or equal to 70 bar, greater than or equal to $10^{-11}$ bar and less than or equal to $10^{-3}$ bar, greater than or equal to $10^{-3}$ bar and less than or equal to 70 bar, greater than or equal to $10^{-3}$ bar and less than or equal to 1 bar, or greater than or equal to $10^{-3}$ bar and less than or equal to $10^{-1}$ bar). Other ranges are also possible. The pressure may be determined by a pressure gauge. In some embodiments, the pressure of the environment to which the de-bound metal structure is exposed is cycled between atmospheric pressure and a pressure in one or more of the above-referenced ranges.

In some embodiments, an environment to which a de-bound metal structure is exposed during a heating step of a sintering process is a gaseous environment, where the environment comprises one or more gases. For instance, in some embodiments, the relevant environment may comprise one or more species that are reactive at the temperature to which the environment is heated. For example, the relevant environment may be an oxidative environment (e.g., it may comprise air) or a reductive environment. A reductive environment generally refers to one containing reducing species, such as hydrogen (e.g. pure hydrogen, a mixture of hydrogen and argon comprising 1 volume percent (vol %) to 6 vol % hydrogen, a mixture of hydrogen and argon comprising up to 10 vol % hydrogen). In some embodiments, the relevant environment is an inert environment. By way of example, the relevant environment may comprise, consist of, and/or consist essentially of inert gases, such as nitrogen, argon, and/or helium.

In some embodiments in which the environment in which a de-bound metal structure is heated in an oxidative environment (e.g., during sintering step 80), the environment is a gaseous environment having a suitable oxygen ($O_2$) content. For example, in some embodiments, an oxidative environment in which a de-bound metal structure is heated has an oxygen content of greater than or equal to 10%, greater than or equal to 12%, greater than or equal to 15%, greater than or equal to 18%, greater than or equal to 20% by volume, greater than or equal to 30%, greater than or equal to 50%, greater than or equal to 75%, or greater by volume. In some cases, an oxidative environment in which a de-bound metal structure is heated has an oxygen content of less than or equal to 100%, less than or equal to 90%, less than or equal to 75%, less than or equal to 60%, less than or equal to 50%, less than or equal to 40%, less than or equal to 30%, less than or equal to 25%, less than or equal to 23%, less than or equal to 22%, less than or equal to 21%, less than or equal to 20%, less than or equal to 18%, less than or equal to 15%, or less than or equal to 10% by volume. Combinations of these ranges are possible. For example, in some embodiments, an oxidative environment in which a de-bound metal structure is heated has an oxygen content of greater than or equal to 10% and less than or equal to 100% by volume, or greater than or equal to 10% and less than or equal to 23% by volume. In some embodiments, the oxidative environment is a gaseous environment that is or comprises air.

In some embodiments in which the environment in which a de-bound metal-structure is heated in an oxidative environment, the environment is a gaseous environment having oxygen ($O_2$) at a suitable partial pressure. For example, in some embodiments, an oxidative environment in which a de-bound metal structure is heated has an oxygen partial pressure of greater than or equal to $10^{-5}$ bar, greater than or equal to $10^{-4}$ bar, greater than or equal to $10^{-3}$ bar, greater than or equal to $10^{-2}$ bar, greater than or equal to $10^{-1}$ bar, $2 \times 10^{-1}$ bar, greater than or equal to 1 bar, greater than or equal to 10 bar, greater than or equal to 20 bar, or greater than or equal to 50 bar. In some cases, an oxidative environment in which a de-bound metal structure is heated has an oxygen partial pressure of less than or equal to 70 bar, less than or equal to 50 bar, less than or equal to 20 bar, less than or equal to 10 bar, less than or equal to 1 bar, less than or equal to $2 \times 10^{-1}$ bar, less than or equal to $10^{-1}$ bar, less than or equal to $10^{-2}$ bar, less than or equal to $10^{-3}$ bar, or less than or equal to $10^{-4}$ bar. Combinations of these ranges are possible. For example, in some embodiments, an oxidative environment in which a de-bound structure is heated has an oxygen partial pressure of greater than or equal to $10^{-5}$ bar and less than or equal to 70 bar.

In some embodiments in which the environment in which a de-bound metal structure is heated in a reductive environment (e.g., during sintering step 80), the environment is a gaseous environment having a suitable hydrogen ($H_2$) content. For instance, in some embodiments, an environment in which a de-bound metal structure is heated during sintering is a gaseous environment having a hydrogen content of greater than or equal to 2 vol %, greater than or equal to 4 vol %, greater than or equal to 6 vol %, greater than or equal to 8 vol %, greater than or equal to 10 vol %, greater than or equal to 20 vol %, greater than or equal to 30 vol %, greater than or equal to 50 vol %, greater than or equal to 75 vol %, greater than or equal to 90 vol %, greater than or equal to 95 vol %, or higher. The reductive gaseous environment in which the de-bound metal structure is heated during sintering may have a hydrogen content of less than or equal to 100 vol %, less than or equal to 99 vol %, less than or equal to 95 vol %, less than or equal to 90 vol %, less than or equal to 75 vol %, less than or equal to 50 vol %, less than or equal to 40 vol %, less than or equal to 30 vol %, less than or equal to 20 vol %, less than or equal to 10 vol %, less than or equal to 8 vol %, less than or equal to 6 vol %, or less than or equal to 4 vol % hydrogen. Combinations of the above-referenced ranges are also possible (e.g., a hydrogen content of greater than or equal to 2 vol % and less than or equal to 100 vol %, or a hydrogen content of greater than or equal to 2 vol % and less than or equal to 10 vol %). Other ranges are also possible.

In some embodiments, a reductive gaseous environment in which a de-bound metal structure is heated during sintering has a partial pressure of hydrogen of greater than or equal to $10^{-5}$ bar, greater than or equal to $10^{-4}$ bar, greater than or equal to $10^{-3}$ bar, greater than or equal to $10^{-2}$ bar, greater than or equal to $10^{-1}$ bar, greater than or equal to 1 bar, greater than or equal to 10 bar, greater than or equal to 20 bar, or greater than or equal to 50 bar. In some embodiments, a reductive gaseous environment in which a de-bound metal structure is heated during sintering has a partial pressure of hydrogen of less than or equal to 70 bar, less than or equal to 50 bar, less than or equal to 20 bar, less than or equal to 10 bar, less than or equal to 1 bar,, less than or equal to $10^{-1}$ bar, less than or equal to $10^{-2}$ bar, less than or equal to $10^{-3}$ bar, or less than or equal to $10^{-4}$ bar. Combinations of these ranges (e.g., greater than or equal to $10^{-5}$ bar hydrogen and less than or equal to 70 bar hydrogen) are possible.

While in some embodiments the various heating steps are each performed in a different chamber (e.g., oven), in other embodiments multiple heating steps can be performed in the same chamber. For example, in certain instances, some or all the heating for de-binding (e.g., step 70 in FIGS. 1A-1B) occurs in a chamber, and some or all of the sintering (e.g., step 80 in FIG. 1B) also occurs in the chamber (e.g., the same oven). Heating for de-binding and sintering may be performed in the same chamber even in instances in which de-binding and sintering are performed in different environments. For example, a single chamber may be configured to heat contents of the chamber within first and second environments having different temperatures and/or comprising different constituent gas(es). Surprisingly, it has been observed that a single chamber may be configured to successfully de-bind and sinter even in instances in which de-binding occurs a first environment having a first type of reactivity (e.g., oxidative) and sintering in a second environment having a second, different type of reactivity (e.g., reductive). For example, the chamber may comprise components that have little to no reactivity with either oxidative gases (e.g., oxygen) or reductive gases (e.g., hydrogen). In at least some instances, performing different heating steps (e.g., de-binding, sintering) in the same chamber (e.g., oven) increases the efficiency and/or speed of the overall additive manufacturing process. For example, because de-bound metal structures produced through de-binding do not need to be removed from one device and supplied to another before sintering, this time may be saved. Additionally, in some instances use of the same chamber for different heating steps reduces complexity and cost by reducing the number of process steps, separate components/apparatuses, and overall system footprint.

In some embodiments, an additive manufacturing method comprises heating a metal-based composite structure (e.g., comprising a metal powder) in a first environment in a chamber to form a de-bound metal structure, and sintering the de-bound metal structure in a second environment in the same chamber to form a metal object. In some such embodiments, the first environment is an oxidative environment having a temperature of greater than or equal to 220° C. and less than or equal to 450° C., as described above. The second environment within the chamber during sintering may have an elevated temperature, such as a temperature of greater than or equal to 750° C. and less than or equal to 1700° C., as described above. In some embodiments, the de-bound metal structure formed during the heating in the first environment is not removed from the chamber prior to the sintering step. For example, the metal-based composite structure may be heated in a first environment (e.g., an oxidative environment having a temperature of greater than or equal to 220° C. and less than or equal to 450° C.), and then, without removing the resulting de-bound metal structure, the temperature is increased (e.g., ramped) to a second environment having an elevated temperature for sintering (e.g., at a temperature of greater than or equal to 750° C. and less than or equal to 1700° C.).

The change in temperature between the first environment and the second environment may be achieved using any of a variety of techniques. In some embodiments, the chamber is configured to heat contents of the chamber to the temperature of a first environment and to also heat contents of the chamber to the temperature of a second environment by operating heating elements of the same type, or even by operating a single heating element. For example, in some embodiments the chamber is configured to heat contents of the chamber at a first temperature (in a first environment) by operating a heating element configured for convective heating, and the chamber is also configured to heat contents of the chamber at a second temperature (in a second environment) for sintering using the same convective heating element. As another example, the chamber may, in some instances, be configured to heat contents of the chamber in both in the first environment and the second environment using a radiative heating element. In some embodiments, the chamber comprises multiple heating elements, and is configured to heat contents of the chamber at a first temperature (in the first environment) using a first heating element and to heat contents of the chamber at a second temperature (in the second environment) using a second, different heating element. As one non-limiting example, the chamber may be configured to heat contents of the chamber in a first environment (e.g., an oxidative gaseous environment) using a first heating element configured for convective heat transfer, and the chamber may be configured to heat contents of the chamber in the second environment (e.g., a vacuum environment) for sintering using a second heating element configured for radiative heat transfer (e.g., an infrared lamp).

In some embodiments where the heating for de-binding and the sintering are performed in the same chamber, the second environment has the same type of gaseous environment as the first environment. For example, in some embodiments, the first environment is an oxidative environment (e.g., a gaseous environment containing oxygen, such as air), and the second environment used for sintering has the same oxidative environment. In some such embodiments, the metal-based composite structure (e.g., comprising platinum metal and/or a platinum alloy) is placed in the chamber at room temperature, and the temperature is first elevated to a de-binding temperature and then elevated to a sintering temperature without a change in the type of gaseous environment (e.g., oxidative) in the chamber. The change in temperature may occur in stages (e.g., with holds), or the change in temperature (e.g., from room temperature to the temperature of the first environment to the temperature of the second environment) may occur via a continuous temperature ramp, such that de-binding occurs during a portion of the temperature ramp. In some embodiments, the second environment used for sintering has a different type of gaseous environment than the first gaseous environment. For example, in some embodiments, the first environment is an oxidative environment (e.g., a gaseous environment containing oxygen, such as air), and the second environment used for sintering is an inert environment, or a vacuum environment, or a reductive environment (e.g., a gaseous environment containing hydrogen). In some instances where the second environment has a different type of gaseous environment than the first environment used de-binding, an intermediate environment is used between the first environment and the second environment. As one non-limiting example, the first environment used for de-binding may be an oxidative environment in a first temperature range (e.g., greater than or equal to 220° C. and less than or equal to 450° C.), and subsequently the chamber is changed to an intermediate environment having a reductive gaseous (or inert gaseous, or vacuum) environment but still in the first temperature range (e.g., greater than or equal to 220° C. and less than or equal to 450° C.). The de-bound metal structure is held at the intermediate environment for a period of time. The environment in the chamber is then changed to the second environment for sintering, the second environment having the same reductive gaseous (or inert gaseous, or vacuum) environment as the intermediate environment, but having an elevated temperature range (e.g., greater than or equal to 750° C. and less than or equal to 1700° C.).

The type of gaseous environment of the chamber may be changed using any of a variety of suitable techniques. For example, the chamber may be configured such that one or more gases (or gas mixtures) may be flowed into and/or through the headspace of the chamber. Exemplary configurations include chambers equipped with gas inlets and gas outlets, which may be operated (manually and/or automatically) to direct gas into or out of the chamber. In some embodiments, the gas inlet is fluidically connected to a gas mixture source and, optionally, configured with one or more pumps configured to flow the gas mixture into and/or through the chamber. In some embodiments in which the chamber is configured to heat a metal-based composite structure in a first environment and sinter a de-bound metal structure in a second environment having a different gaseous environment, the chamber is configured to be fluidically connected to two or more different gas mixture sources (e.g., with a gas inlet connected to two different gas tanks and valving for switching flow to the chamber between the different gas tanks, or two or more gas inlets connected to different pressurized gas tanks and valving for switching flow to the chamber between different gas inlets). As a specific example, the first environment may be air, and the second environment may be established by flowing a different gas mixture (e.g., a reductive gas such as forming gas) into and/or through the chamber (e.g., via a gas inlet optionally connected to a pump). In some cases, the chamber may be coupled to a reduced pressure source such as a vacuum pump, which may be operated to evacuate or otherwise remove gas from the interior of the chamber.

Another way to change the type of gaseous environment of the chamber may be to configure the chamber such that the gaseous environment can be evacuated via vacuum. For example, the chamber may comprise a headspace fluidically connected to a vacuum source and valving for exposing the headspace to the vacuum source when desired. The chamber may also be configured to flow gas mixtures into and through the headspace (e.g., via one or more gas inlets, gas outlets, valves and pumps connected to a gas mixture source). The chamber may be configured to back-fill the headspace with a gas mixture to establish a gaseous environment after a vacuum evacuation process. In some cases, the first environment is gaseous (e.g., air), the gas is evacuated from the chamber, and the chamber is subsequently back-filled with a different gas mixture (e.g., forming gas) to establish the second environment.

Formation of a metal object by sintering may comprise heating an environment in which a de-bound metal structure is positioned in for a variety of suitable amounts of time. In some embodiments, an environment in which a de-bound metal structure is positioned is heated for a time period of greater than or equal to 30 minutes, greater than or equal to 1 hour, greater than or equal to 2 hours, greater than or equal to 3 hours, greater than or equal to 6 hours, greater than or equal to 9 hours, greater than or equal to 12 hours, greater than or equal to 18 hours, greater than or equal to 1 day, or greater than or equal to 1.5 days. In some embodiments, an environment in which a de-bound metal structure is positioned is heated for a time period of less than or equal to 2 days, less than or equal to 1.5 days, less than or equal to 1 day, less than or equal to 18 hours, less than or equal to 12 hours, less than or equal to 9 hours, less than or equal to 6 hours, less than or equal to 3 hours, less than or equal to 2 hours, or less than or equal to 1 hour. Combinations of the above-referenced ranges are also possible (e.g., greater than or equal to 30 minutes and less than or equal to 2 days). Other ranges are also possible.

In some embodiments, heating a de-bound metal structure heating the environment in which the de-bound metal structure is positioned to one temperature in one or more of the above-referenced ranges and holding the temperature of the environment thereat for an amount of time in one of the above-referenced ranges. As a non-limiting example, the entire sintering step may involve holding the temperature of the environment at 830° C. for 6 hours in certain cases. In some embodiments, heating a de-bound metal structure comprises heating an environment in which the de-bound metal is positioned to two or more temperatures in the above-referenced ranges sequentially and holding the temperature of the environment at each of the two or more temperatures. In such embodiments, the relevant environment may be held at each of the relevant temperatures for a period of time in one or more of the above-referenced ranges and/or may be heated such that the total time it is held at all of the relevant temperatures is in one or more of the above-referenced ranges. As a non-limiting example, the sintering step may involve holding the temperature at 700° C. for up to 3 hours, then holding the temperature at 820° C. for up to 3 hours, and then holding the temperature at 840° C. for up to 3 hours.

While some embodiments comprise sintering the de-bound metal structure a single time using the conditions described above, other embodiments comprise multiple such sintering steps. For example, an additive manufacturing method may comprise a first sintering step that forms an initial metal object, and then the initial metal object may undergo a second sintering step (e.g., under the same or different conditions as the first sintering step). It has been observed in the context of the present disclosure that a second sintering step (e.g., a second heating step during step 80) can lead to higher densities of finished metal products relative to instances where an otherwise identical process is performed but using just a single sintering step.

Figure 7A:
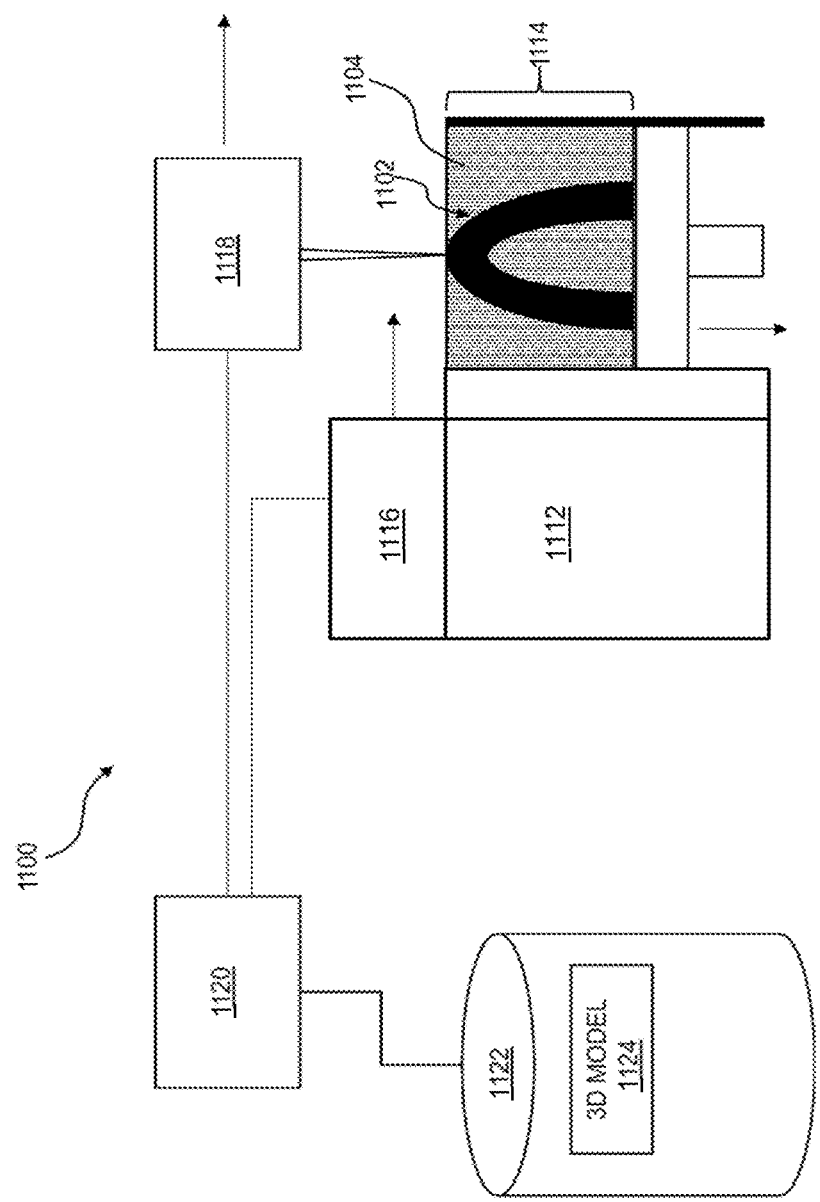
FIGS. 7A-7B show two similar versions of an exemplary additive manufacturing system, in accordance with some embodiments.
Figure 7B:
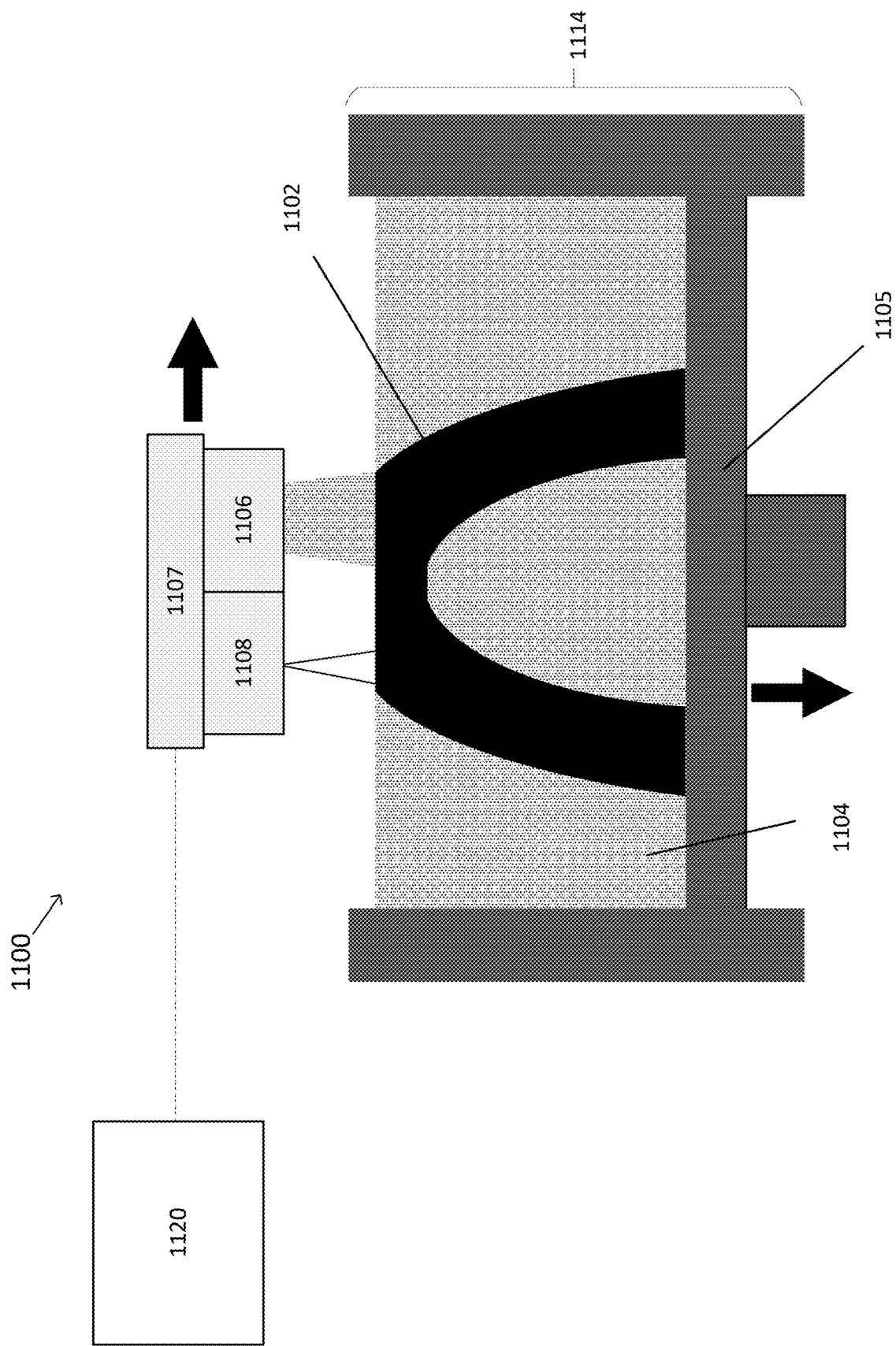

In some embodiments, one or more of the method steps described above may be performed in an additive manufacturing system. FIGS. 7A and 7B show two similar versions of an exemplary additive manufacturing system 1100. The various components of this additive manufacturing system and its operation are described below.

The additive manufacturing system 1100 shown in FIGS. 7A and 7B may be operated to form an article (part) 1102 from a metal powder 1104. The article 1102 may be a three-dimensional composition as described elsewhere herein. For instance, it may comprise a binder composition comprising the second material and a metal powder comprising a plurality of metal particles coated at least in part with the first material (e.g., as shown in FIGS. 3A-3C). As also described elsewhere herein, the three-dimensional composition 1102 can undergo subsequent steps to form a metal object. The additive manufacturing system shown in FIGS. 7A and 7B may be suitable for performing a binder jetting process to form a three-dimensional composition (e.g., by selectively joining portions of layers of metal powder with a binder composition in a sequential manner).

The additive manufacturing system 1100 shown in FIGS. 7A and 7B can include a powder deposition mechanism 1106 (e.g., shown in FIG. 7B) and a print head (e.g., shown as print head 1118 in FIG. 7A and print head 1108 in FIG. 7B), which may be coupled to and moved across the print area by a unit 1107 (e.g., as shown in FIG. 7B). The powder deposition mechanism 1106 may be operated to deposit a layer of metal powder by depositing powder 1104 onto the powder bed 1114.

In some embodiments, a powder deposition mechanism comprises a metal powder supply 1112, a metal powder bed 1114, and a spreader 1116 (e.g., as shown in FIG. 7A). When present, the spreader 1116 can be movable from the metal powder supply 1112 to the metal powder bed 1114 and along the metal powder bed 1114 to deposit a metal powder onto the metal powder bed 1114 and to deposit successive layers of the metal powder across the metal powder bed 1114. As discussed in more detail below, the additive manufacturing apparatus 1100 and/or the spreader 1116 therein may be configured to deposit layers of metal powder on the powder bed having any suitable geometry (e.g., layers of metal powder having a homogeneous, planar geometry; layers of metal powder having a morphology other than a homogeneous, planar geometry). Depending on the particular embodiment, the spreader 1116 may include, for example, a roller rotatable about an axis perpendicular to an axis of movement of the spreader 1116 across the powder bed 1114. The roller can be, for example, substantially cylindrical. In use, rotation of the roller about the axis perpendicular to the axis of movement of the spreader 1116 can deposit the metal powder from the metal powder supply 1112 to the metal powder bed 1114 and form a layer of the metal powder along the metal powder bed 1114. It should be appreciated, therefore, that a plurality of sequential layers of the material 1104 can be formed in the metal powder bed 1114 through repeated movement of the spreader 1116 across the metal powder bed 1114.

The print head 1108 (in FIG. 7B) and/or 1118 (in FIG. 7A) can be movable (e.g., in coordination with movement of the spreader 1116) across the metal powder bed 1114 and/or can be stationary (e.g., in embodiments in which the platform 1105 is movable). In some embodiments, the print head 1108 and/or 1118 includes one or more orifices through which a liquid (e.g., a binder composition comprising the second material) can be delivered from the print head 1118 to each layer of the metal powder along the metal powder bed 1114. In certain embodiments, the print head 1108 and/or 1118 can include one or more piezoelectric elements, and each piezoelectric element may be associated with a respective orifice and, in use, each piezoelectric element can be selectively actuated such that displacement of the piezoelectric element can expel liquid from the respective orifice. In some embodiments, the print head 1108 and/or 1118 may be arranged to expel a single liquid formulation from the one or more orifices. In other embodiments, the print head 1108 and/or 1118 may be arranged to expel a plurality of liquid formulations from the one or more orifices. For example, the print head 1108 and/or 1118 can expel a plurality of liquids (e.g., a plurality of solvents), a plurality of components of a binder composition, or both from the one or more orifices. Moreover, in some instances, expelling or otherwise delivering a liquid from the print head may include emitting an aerosolized liquid (i.e., an aerosol spray) from a nozzle of the print head.

In general, the print head 1108 in FIG. 7B and/or 1118 in FIG. 7A may be controlled to deliver liquid such as a binder composition comprising the second material to the metal powder bed 1114 in predetermined two-dimensional patterns, with each pattern corresponding to a respective layer of the three-dimensional composition 1102. In this manner, the delivery of the binder composition may be a printing operation in which the metal powder in each respective layer of the three-dimensional composition is selectively joined along the predetermined two-dimensional layers. After each layer of the three-dimensional composition is formed as described above, the platform 1105 may be moved down and a new layer of metal powder deposited, binder composition again applied to the new metal powder, etc. until the object has been formed.

In some embodiments, the print head 1108 (in FIG. 7B) and/or 1118 (in FIG. 7A) can extend axially along substantially an entire dimension of the metal powder bed 1114 in a direction perpendicular to a direction of movement of the print head 1108 and/or 1118 across the metal powder bed 1114. For example, in such embodiments, the print head 1118 can define a plurality of orifices arranged along the axial extent of the print head 1108 and/or 1118, and liquid can be selectively jetted from these orifices along the axial extent to form a predetermined two-dimensional pattern of liquid along the metal powder bed 1114 as the print head 1108 and/or 1118 moves across the metal powder bed 1114. In some embodiments, the print head 1108 and/or 1118 may extend only partially across the metal powder bed 1114, and the print head 1108 and/or 1118 may be movable in two dimensions relative to a plane defined by the powder bed 1114 to deliver a predetermined two-dimensional pattern of a liquid along the powder bed 1114.

The additive manufacturing system 1100 generally further includes a controller 1120 in electrical communication with one or more other system components. For instance, in FIG. 7A, a controller 1120 is in electrical communication with the metal powder supply 1112, the metal powder bed 1114, the spreader 1116, and the print head 1118. In FIG. 7B, the controller 1120 is in electrical communication with the unit 1107, the powder deposition mechanism 1106, and the print head 1108. Also in FIG. 7B, the controller 1120 may be configured to control the motion of the unit 1107, the material deposition mechanism 1106, and the print head 1108 as described above.

A non-transitory, computer readable storage medium 1122 may be in communication with the controller 1120 and have stored thereon a three-dimensional model 1124 and instructions for carrying out any one or more of the methods described herein. Alternatively, the non-transitory, computer readable storage medium may comprise previously prepared instructions. With reference to FIG. 7B, such instructions, when executed by the controller 1120, may operate the platform 1105, the unit 1107, the material deposition mechanism 1106, and the print head 1108 to fabricate one or more three-dimensional compositions. For example, one or more processors of the controller 1120 can execute instructions to move the unit 1107 forwards and backwards along an x-axis direction across the surface of the powder bed 1114. One or more processors of the controller 1120 also may control the material deposition mechanism 1106 to deposit build material onto the metal powder bed 1114.

With reference to FIG. 7A, one or more processors of the controller 1120 can execute instructions to control movement of one or more of the metal powder supply 1112 and the metal powder bed 1114 relative to one another as the three-dimensional composition 1102 is being formed. For example, one or more processors of the controller 1120 can execute instructions to move the metal powder supply 1112 in a z-axis direction toward the spreader 1116 to direct the metal powder 1104 toward the spreader 1116 as each layer of the three-dimensional composition 102 is formed and to move the metal powder bed 1114 in a z-axis direction away from the spreader 1116 to accept each new layer of the metal powder along the top of the metal powder bed 1114 as the spreader 1116 moves across the metal powder bed 1114. One or more processors of the controller 1120 also may control movement of the spreader 1116 from the metal powder supply 1112 to the metal powder bed 1114 to move successive layers of the metal powder across the metal powder bed 1114.

In some embodiments, one or more processors of the controller 1120 can control movement of the print head 1108 (in FIG. 7B) and/or 1118 (in FIG. 7A) to deposit liquid such as a binder composition onto selected regions of the metal powder bed 1114 to deliver a respective predetermined two-dimensional pattern of the liquid to each new layer of the metal powder 1104 along the top of the metal powder bed 1114. In general, as a plurality of sequential layers of the metal powder 1104 are introduced to the metal powder bed 1114 and the predetermined two-dimensional patterns of the liquid are delivered to each respective layer of the plurality of sequential layers of the metal powder 1104, the three-dimensional composition 1102 is formed according to the three-dimensional model (e.g., a model stored in a non-transitory, computer readable storage medium coupled to, or otherwise accessible by, the controller 1120, such as three-dimensional model 1124 stored in the non-transitory, computer readable storage medium 1122). In certain embodiments, the controller 1120 may retrieve the three-dimensional model (e.g., three-dimensional model 1124) in response to user input, and generate machine-ready instructions for execution by the additive manufacturing system 1100 to fabricate the three-dimensional object 1102.

As described above, it will be appreciated that the illustrative additive manufacturing system 1100 is provided as one example of a suitable additive manufacturing system and is not intended to be limiting with respect to the techniques described herein for controlling the flow behavior of a metal powder. For instance, it will be appreciated that the techniques may be applied within an additive manufacturing apparatus that utilizes only a roller as a material deposition mechanism and does not include material deposition mechanism 1106.

According to some embodiments, the techniques described herein for controlling the flow behavior of a metal powder may be employed to control properties of a metal powder for a binder jet additive manufacturing system. Such a system may comprise additive manufacturing system 1100 in addition to one or more other apparatus for producing a completed part (e.g., a metal object as described herein). Such apparatus may include, for example, an oven for debinding and/or sintering a three-dimensional composition fabricated by the additive manufacturing system 1100 (or for de-binding and/or sintering such a three-dimensional composition subsequent to applying other post-processing steps upon the three-dimensional composition).

Techniques described herein may refer to a "metal powder," although it will be appreciated that the techniques described herein are not necessarily limited to use cases in which the metal material employed to form one or more of the articles described herein comprises or consists of a powder. As such, while the discussion above may focus primarily on depositing a binder composition comprising the second material onto a metal powder, it will be appreciated that any binder deposition process described herein may also apply to deposition of a binder onto any granular material(s), including ceramic powders, that are coated at least in part with the first material.

Figure 8:
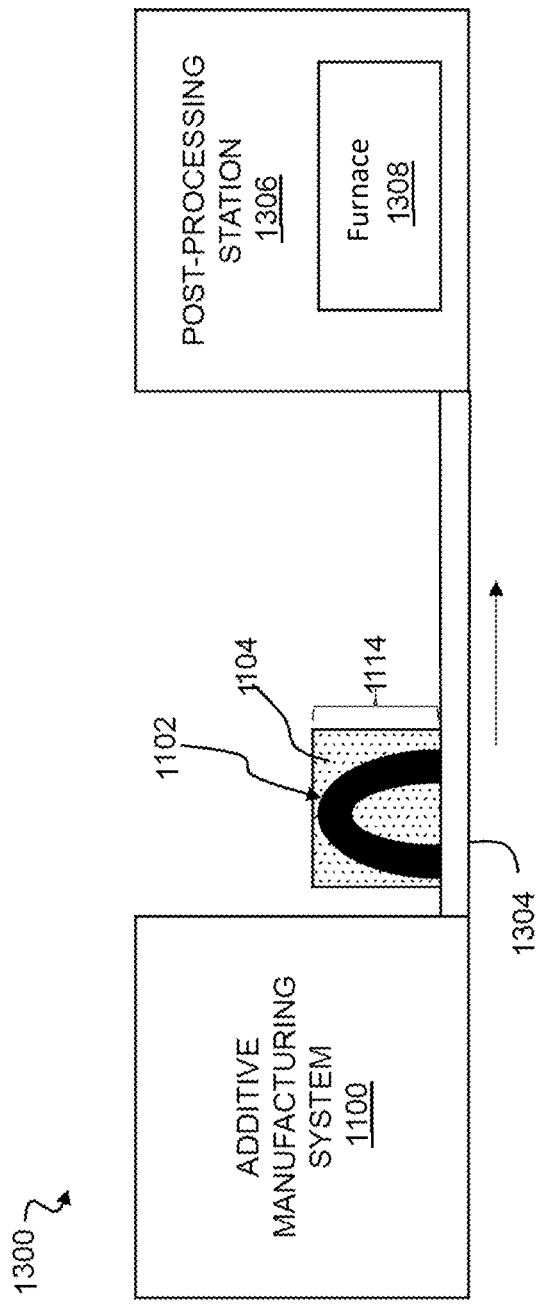
FIG. 8 shows one non-limiting embodiment of an additive manufacturing plant, in accordance with some embodiments.

Referring now to FIG. 8, an additive manufacturing plant 1300 can include the additive manufacturing system 1100, a conveyor 1304, and a post-processing station 1306. The metal powder bed 1114 containing the three-dimensional composition 1102 can be moved along the conveyor 1304 and into the post-processing station 1306. The conveyor 1304 can be, for example, a belt conveyor movable in a direction from the additive manufacturing system 1100 toward the post-processing station. Additionally, or alternatively, the conveyor 1304 can include a cart on which the powder bed 1114 is mounted and, in certain instances, the powder bed 1114 can be moved from the additive manufacturing system 1100 to the post-processing station 1306 through movement of the cart (e.g., through the use of actuators to move the cart along rails or by an operator pushing the cart).

In the post-processing station 1306 shown in FIG. 8, the three-dimensional composition 1102 can be heated in the metal powder bed 1114 to remove at least some of the liquid of the binder composition in the three-dimensional composition and to form a metal-based composite structure (e.g., a self-supporting metal-based composite structure) within the metal powder bed. The metal-based composite structure can be removed from the metal powder bed 1114. According to some aspects, the binder compositions described herein may aid in attaining a desired mechanical strength characteristic of the metal-based composite structure, thereby allowing for improved ability to handle the metal-based composite structure and improved consistency in metal objects formed from such metal-based composite structures. The metal powder 1104 remaining in the metal powder bed 1114 upon removal of the metal-based composite structure can be, for example, recycled for use in subsequent fabrication of additional parts. Additionally, or alternatively, in the post-processing station 1306, the metal-based composite structure can be cleaned (e.g., through the use of pressurized air) of excess amounts of the metal powder 1104.

In systems employing a binder jetting process, a metal-based composite structure can undergo one or more de-binding processes (e.g., step 70 of FIGS. 1A-1B) in the post-processing station 1306 to remove all or a portion of a polymer of the binder composition from the metal-based composite structure 1102. One example of a suitable de-binding process is a thermal de-binding process (e.g., heating as described elsewhere herein, particularly in the context of noble metals and/or copper).

The post-processing station 1306 shown in FIG. 8 can include furnace 1308. The metal-based composite structure can undergo de-binding in furnace 1308. In some embodiments, the de-bound metal structure can undergo sintering (e.g., step 80 of FIG. 1B) in furnace 1308 such that the metal particles of the powder 1106 melt (e.g., to an extent not overall undesirable) and combine with one another to form a metal object.

As described above, in some embodiments, a binder composition comprising the second material (and/or one or more components thereof) is configured to form one or more of the articles described herein (e.g., a three-dimensional composition) in combination with a metal powder coated at least in part with the first material, as described herein. In some embodiments, one or more of the articles described herein (e.g., a de-bound metal composition or a metal object) may be formed from a binder composition described herein. Such articles may comprise the binder composition, may comprise some components of the binder composition but lack other components of the binder composition (e.g., may comprise a polymer present in the binder composition but lack a solvent present in the binder composition), or may not include any components of the binder composition. In some embodiments, an article described herein comprises a reaction product of a binder composition (e.g., a polymer present in the binder composition that has been cross-linked, such as by a cross-linking agent present in the binder composition; a thermal decomposition product of a component of the binder composition, such as char).

As also described above, some binder compositions described herein may have one or more physical properties that enhances their suitability for use in one or more of the methods described herein, such as one or more of the methods for additive manufacturing described herein, and/or in one or more of the articles described herein, such as a three-dimensional object, a metal-based composite structure, a de-bound metal structure, and/or a metal object. Further details regarding some such physical properties is provided below.

In some embodiments, a binder composition described herein may have an advantageous viscosity. Without wishing to be bound by any particular theory, it is believed that the viscosity of the binder composition may affect its ability to be printed by a particular print head. For instance, some print heads may be designed to print binder compositions having a certain range of viscosities and may be unable to print compositions having viscosities outside of this range in a manner that is reliable and/or desirable. By way of example, binder compositions having viscosities above the range for which the print head is configured may not flow or may not flow appreciably at the pressures provided by the print head. As another example, binder compositions having viscosities below the range for which the print head is configured may flow in undesirable manners at the pressures provided by the print head (e.g., flow in a manner that produces droplets that are coalesced, take the form a mist, and/or misdirected), resulting in poor control over the deposition of the binder composition from the print head.

In some embodiments, a binder composition has a viscosity at a printing temperature of greater than or equal to 0.55 cP, greater than or equal to 1 cP, greater than or equal to 1.5 cP, greater than or equal to 2 cP, greater than or equal to 2.5 cP, greater than or equal to 3 cP, greater than or equal to 3.5 cP, greater than or equal to 4 cP, greater than or equal to 5 cP, greater than or equal to 6 cP, greater than or equal to 7 cP, greater than or equal to 8 cP, greater than or equal to 10 cP, greater than or equal to 12.5 cP, greater than or equal to 15 cP, greater than or equal to 17.5 cP, greater than or equal to 20 cP, greater than or equal to 22.5 cP, greater than or equal to 25 cP, or greater than or equal to 27.5 cP. In some embodiments, a binder composition has a viscosity at a printing temperature of less than or equal to 30 cP, less than or equal to 27.5 cP, less than or equal to 25 cP, less than or equal to 22.5 cP, less than or equal to 20 cP, less than or equal to 17.5 cP, less than or equal to 15 cP, less than or equal to 12.5 cP, less than or equal to 10 cP, less than or equal to 8 cP, less than or equal to 7 cP, less than or equal to 6 cP, less than or equal to 5 cP, less than or equal to 4 cP, less than or equal to 3.5 cP, less than or equal to 3 cP, less than or equal to 2.5 cP, less than or equal to 2 cP, less than or equal to 1.5 cP, or less than or equal to 1 cP. Combinations of the above-referenced ranges are also possible (e.g., greater than or equal to 0.55 cP and less than or equal to 30 cP, greater than or equal to 1 cP and less than or equal to 10 cP, greater than or equal to 3 cP and less than or equal to 30 cP, or greater than or equal to 3 cP and less than or equal to 10 cP). Other ranges are also possible. The viscosity of the binder composition may be determined by use of a cone and plate rheometer operated at a shear rate of 300 s$^{-1}$.

The viscosities described above may be desirable for use with particular print heads of interest (e.g., piezoelectric print heads, thermal print heads, print heads suitable for ink jet printing). By way of example, in some embodiments, it may be desirable for a binder composition configured to be deposited thermally (e.g., by a thermal print head) to have a viscosity of greater than or equal to 1 cP and less than or equal to 10 cP at the printing temperature. As another example, in some embodiments, it may be desirable for a binder composition configured to be deposited piezoelectrically (e.g., by a piezoelectric print head) to have a viscosity of greater than or equal to 3 cP and less than or equal to 30 cP at the printing temperature.

The printing temperature may be a temperature at which the binder composition is ejected from a print head (e.g., by an additive manufacturing process, by a binder jetting process). In some embodiments, the printing temperature is greater than or equal to 20° C., greater than or equal to 25° C., greater than or equal to 30° C., greater than or equal to 35° C., or greater than or equal to 40° C. In some embodiments, the printing temperature is less than or equal to 45° C., less than or equal to 40° C., less than or equal to 35° C., less than or equal to 30° C., or less than or equal to 20° C. Combinations of the above-referenced ranges are also possible (e.g., greater than or equal to 20° C. and less than or equal to 40° C.). Other ranges are also possible.

As described above, some binder compositions have pHs that are non-corrosive to one or more articles with which the binder composition is configured to contact during formation of a metal-based composite structure. As also described above, these components may include portions of a printer, such as a print head, and/or components to be incorporated into a metal-based composite structure, such as a metal powder. In some embodiments, a binder composition that is a weak acid or that is a base may be less corrosive to such components than a binder composition that is a strong acid. Some binder compositions that are weak acids and/or bases may be non-corrosive to such components. For binder compositions configured to be employed with a metal powder particularly susceptible to corrosion, such as a steel powder, suitable values of pH for the binder composition may be higher than for those configured to be employed with a plurality of particles less susceptible to corrosion.

In some embodiments, a binder composition has a pH of greater than or equal to 4, greater than or equal to 4.5, greater than or equal to 5, greater than or equal to 5.5, greater than or equal to 6, greater than or equal to 6.5, greater than or equal to 7, greater than or equal to 7.5, greater than or equal to 8, greater than or equal to 8.5, greater than or equal to 9 greater than or equal to 9.5, greater than or equal to 10, or greater than or equal to 10.5. In some embodiments, a binder composition has a pH of less than or equal to 11, less than or equal to 10.5, less than or equal to 10, less than or equal to 9.5, less than or equal to 9, less than or equal to 8.5, less than or equal to 8, less than or equal to 7.5, less than or equal to 7, less than or equal to 6.5, less than or equal to 6, less than or equal to 5.5, or less than or equal to 5. Combinations of the above-referenced ranges are also possible (e.g., greater than or equal to 4 and less than or equal to 11, greater than or equal to 5 and less than or equal to 8, greater than or equal to 7 and less than or equal to 11, or greater than or equal to 7 and less than or equal to 9). Other ranges are also possible. The pH of a binder composition may be measured with a pH meter.

In some embodiments, the pH of the binder composition may be selected to be compatible with the particular type of metal powder it will be used in combination with. For instance, it may be desirable for binder compositions suitable for use with ferrous alloys having low chromium contents (e.g., below 2 wt %, such as 4140 low alloy steel) to have a weakly basic pH (e.g., greater than or equal to 7 and less than or equal to 11, or greater than or equal to 7 and less than or equal to 9). As another example, it may be desirable for binder compositions suitable for use with steels having appreciable chromium contents (e.g., in excess of 2 wt %, such as stainless steels and some non-stainless steels) to have weakly acidic or weakly basic values of pH (e.g., greater than or equal to 4 and less than or equal to 11, or greater than or equal to 5 and less than or equal to 8).

The binder compositions described herein may have a variety of suitable surface tensions. For instance, in some embodiments, a binder composition has a surface tension of greater than or equal to 18 dynes/cm, greater than or equal to 20 dynes/cm, greater than or equal to 22.5 dynes/cm, greater than or equal to 25 dynes/cm, greater than or equal to 28 dynes/cm, greater than or equal to 30 dynes/cm, greater than or equal to 32.5 dynes/cm, greater than or equal to 35 dynes/cm, greater than or equal to 40 dynes/cm, greater than or equal to 45 dynes/cm, greater than or equal to 50 dynes/cm, greater than or equal to 55 dynes/cm, greater than or equal to 60 dynes/cm, or greater than or equal to 65 dynes/cm. In some embodiments, a binder composition has a surface tension of less than or equal to 70 dynes/cm, less than or equal to 65 dynes/cm, less than or equal to 60 dynes/cm, less than or equal to 55 dynes/cm, less than or equal to 50 dynes/cm, less than or equal to 45 dynes/cm, less than or equal to 40 dynes/cm, less than or equal to 35 dynes/cm, less than or equal to 32.5 dynes/cm, less than or equal to 30 dynes/cm, less than or equal to 28 dynes/cm, less than or equal to 25 dynes/cm, less than or equal to 22.5 dynes/cm, or less than or equal to 20 dynes/cm. Combinations of the above-referenced ranges are also possible (e.g., greater than or equal to 18 dynes/cm and less than or equal to 70 dynes/cm). Other ranges are also possible. The surface tension of a binder composition may be measured in accordance with ASTM D1331-14.

The binder compositions described herein may advantageously produce three-dimensional compositions and/or metal-based composite structures with acceptable mechanical strength when applied to any of a wide variety of metal powders. According to some embodiments, the strength of three-dimensional compositions and/or metal-based composite structures may be measured in a variety of ways, including by measuring the transverse rupture strength (also sometimes called flexural strength), bending strength, yield strength, compressive strength, tensile strength, fatigue strength, or impact strength. Where three-dimensional compositions and/or metal-based composite structures are referred to herein as having a higher "strength" than three-dimensional compositions and/or metal-based composite structures produced using conventional binder compositions, this may refer to any of these measures of strength (or other suitable measures).

As described above, in some embodiments, a binder composition as a whole may comprise a combination of advantageous components. Further details regarding such components are provided below.

Primary Binder Component(s)

In some embodiments, a binder composition comprises one or more primary binder components, which may include one or more diols or polyols (as the second material). In some cases, the primary binder component may also comprise a triol that may be subsequently cross-linked. One example of a suitable type of second material that may be included in a binder composition as a primary binder component is ethylene glycol or polyethylene glycol.

In some embodiments, a primary binder component in a binder composition comprises a low molecular weight polymer (e.g., a low molecular weight polyamide). Advantageously low molecular weight polymers may increase the viscosity of binder compositions to a smaller extent than otherwise equivalent polymers having a higher molecular weight. This may desirably allow for binder compositions to be formulated that both have a beneficial viscosity and include a larger wt % of diols and/or polyols.

One or more diols or polyols suitable for use in the binder compositions described herein may be present in the binder compositions in a variety of suitable amounts. In some embodiments, a binder composition comprises one or more diols or polyols that make up greater than or equal to 75 wt %, greater than or equal to 80 wt %, greater than or equal to 85 wt %, greater than or equal to 90 wt %, or greater than or equal to 95 wt % of the binder composition. In some embodiments, a binder composition comprises one or more diols and/or polyols that make up less than or equal to 98 wt %, less than or equal to 95 wt %, less than or equal to 90 wt %, less than or equal to 85 wt %, less than or equal to 80 wt %, or less than or equal to 75 wt % of the binder composition. Combinations of the above-referenced ranges are also possible (e.g., greater than or equal to 90 wt % and less than or equal to 95 wt %). Other ranges are also possible. It should also be understood that a single diol and/or polyol may not be present in a binder composition in one or more of the above-referenced ranges yet the total amount of diol and/or polyol in a binder composition may be present in one or more of the above-referenced ranges.

In some embodiments, a primary binder component in a binder composition has a water solubility of greater than or equal to 0.5% w/w, 1.0% w/w, 2% w/w, 5% w/w, 10% w/w, 20% w/w, or 25% w/w. In some embodiments, a primary binder component in a binder composition has a water solubility of less than or equal to 30% w/w, 25% w/w, 20% w/w, 10% w/w, 5% w/w, 2% w/w, or 1% w/w. Combinations of the above-referenced ranges are also possible (e.g., a water solubility of greater than or equal to 0.5% w/w and less than or equal to 30% w/w). Other ranges are also possible.

Solvent

In some embodiments, a binder composition comprises a solvent. The solvent may solvate the other components therein (e.g., the second material therein, one or more optional pH modifiers therein, one or more surfactants therein, one or more biocides therein, one or more humectants therein, one or more cross-linking agents therein). In some embodiments, the solvent is a liquid and/or the binder composition is a liquid solution.

In some embodiments, a binder composition comprises a solvent comprising water. In other words, a binder composition may comprise an aqueous solvent and/or an aqueous solution. Without wishing to be bound by any particular theory, it is believed that aqueous solvents may be desirable for use in binder compositions because they may be more environmentally friendly and/or less toxic than other types of solvents (e.g., than organic solvents).

Solvents suitable for use in the binder compositions described herein may be present in the binder compositions in a variety of suitable amounts. In some embodiments, a binder composition comprises a solvent that makes up greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, or greater than or equal to 40 wt %. In some embodiments, a binder composition comprises a solvent that makes up less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, or less than or equal to 5 wt % of the binder composition. Combinations of the above-referenced ranges are also possible (e.g., greater than or equal to 5 wt % and less than or equal to 15 wt %). Other ranges are also possible.

In some cases, water present in the binder composition (e.g., as at least a part of the solvent) makes up greater than or equal to greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, or greater than or equal to 40 wt %. In some embodiments, water present in the binder composition makes up less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, or less than or equal to 5 wt % of the binder composition. Combinations of the above-referenced ranges are also possible (e.g., greater than or equal to 5 wt % and less than or equal to 15 wt %). Other ranges are also possible.

Co-Solvent(s)

Binder compositions comprising a solvent may also comprise one or more co-solvents. The co-solvent(s) may enhance the solubility of one or more components of the binder composition in the solvent (e.g., it may enhance the solubility of one or more diols and/or polyols, one or more pH modifiers, one or more surfactants, one or more biocides, one or more humectants, and/or one or more cross-linking agents in the binder composition). The co-solvent(s) may be liquid(s).

Non-limiting examples of suitable co-solvents include solvents that are miscible with the solvent and readily solubilize one or more components of the binder composition. For instance, when the solvent comprises water and the binder composition comprises one or more organic components, one or more water-soluble organic solvents may be suitable for use as co-solvents. Non-limiting examples of suitable co-solvents include alcohols (e.g., monofunctional alcohols, diols, triols), ketones (e.g., acetone, diacetone, butanone), esters (e.g., ethyl acetate), ethers, lactones (e.g., hydroxybutyrolactone), lactams, pyrrolidones (e.g., N-methyl pyrrolidone, N-phenyl pyrrolidone, 2-pyrrolidone), amides (e.g., dimethyl acetamide), nitriles (e.g., acetonitrile), sulfones (e.g., dimethyl sulfone), and sulfoxides (e.g., dimethyl sulfoxide), and combinations thereof. Further examples of alcohols include methanol, ethanol, isopropanol, 1-butanol, 2-butanol, 1,2-hexanediol, ethylene glycol, propylene glycol, 1-(1-hydroxypropoxy) propan-1-ol, 1-(2-hydroxypropoxy) propan-2-ol, 3,3'-oxybis(propan-1-ol), and dipropylene glycol (a mixture of isomers 1-(1-hydroxypropoxy) propan-1-ol, 1-(2-hydroxypropoxy) propan-2-ol, and 3,3'-oxybis(propan-1-ol)).

Co-solvents suitable for use in the binder compositions described herein may be present in the binder compositions in a variety of suitable amounts. In some embodiments, a binder composition comprises a co-solvent or combination of co-solvents that make up greater than or equal to 0 wt %, greater than or equal to 1 wt %, greater than or equal to 2 wt %, greater than or equal to 3 wt %, greater than or equal to 4 wt %, greater than or equal to 5 wt %, greater than or equal to 7.5 wt %, greater than or equal to 10 wt %, greater than or equal to 15 wt %, greater than or equal to 20 wt %, or greater than or equal to 25 wt % of the binder composition. In some embodiments, a binder composition comprises a co-solvent or combination of co-solvents that make up less than or equal to 30 wt %, less than or equal to 25 wt %, less than or equal to 20 wt %, less than or equal to 15 wt %, less than or equal to 10 wt %, less than or equal to 7.5 wt %, less than or equal to 5 wt %, less than or equal to 4 wt %, less than or equal to 3 wt %, less than or equal to 2 wt %, or less than or equal to 1 wt % of the binder composition. Combinations of the above-referenced ranges are also possible (e.g., greater than or equal to 0 wt % and less than or equal to 30 wt %, or greater than or equal to 0 wt % and less than or equal to 5 wt %). Other ranges are also possible. It should also be understood that a single co-solvent may be present in a binder composition in one or more of the above-referenced ranges (e.g., that further comprises other, different co-solvents or that lacks other, different co-solvents) and/or the total amount of co-solvent in a binder composition may be in one or more of the above-referenced ranges.

pH Modifier(s)

In some, but not necessarily all embodiments, a binder composition comprises one or more pH modifiers. The optional pH modifier(s) may be configured to interact with the other components of the binder composition to adjust the pH to a desired value. For instance, the pH modifier may be configured to interact with the other components of the binder composition to adjust the pH to a value that will not appreciably corrode one or more articles with which the binder composition is configured to contact during formation of a composite structure. It should be understood that in some instances, the binder composition does not comprise a pH modifier.

The binder compositions described herein may comprise pH modifier(s) that are basic. A variety of types of bases may be suitable for use as pH modifiers. For instance, examples of suitable pH modifiers include Arrhenius bases, Lewis bases, and Bronsted-Lowry bases. As another example, a binder composition may comprise an inorganic base and/or an organic base. Non-limiting examples of suitable pH modifiers include hydroxides (e.g., sodium hydroxide, potassium hydroxide, lithium hydroxide), carbonates (e.g., sodium carbonate, potassium carbonate, lithium carbonate), ammonia, tetramethyl ammonium hydroxide, and amine-containing species (e.g., organic amine-containing species that may be aliphatic or aromatic, such as methyl amine, ethyl amine, triethyl amine, ethanolamine, triethanolamine, diaminobenzene), and amine derivatives (e.g., pyridine, imidazole).

The pH modifiers described herein may be selected such that the pH of the binder composition is in a desirable range. In some embodiments, a pH modifier is selected such that the pH of the binder composition is greater than or equal to 2, greater than or equal to 2.5, greater than or equal to 3, greater than or equal to 3.5, greater than or equal to 4, greater than or equal to 4.5, greater than or equal to 5, greater than or equal to 5.5, greater than or equal to 6, greater than or equal to 6.5, greater than or equal to 7, greater than or equal to 7.5, greater than or equal to 8, greater than or equal to 8.5, greater than or equal to 9 greater than or equal to 9.5, greater than or equal to 10, or greater than or equal to 10.5. In some embodiments, a binder composition has a pH of less than or equal to 11, less than or equal to 10.5, less than or equal to 10, less than or equal to 9.5, less than or equal to 9, less than or equal to 8.5, less than or equal to 8, less than or equal to 7.5, less than or equal to 7, less than or equal to 6.5, less than or equal to 6, less than or equal to 5.5, less than or equal to 5, less than or equal to 4.5, less than or equal to 4, less than or equal to 3.5, or less than or equal to 3. Combinations of the above-referenced ranges are also possible (e.g., greater than or equal to 2 and less than or equal to 11, greater than or equal to 5 and less than or equal to 8, greater than or equal to 7 and less than or equal to 11, or greater than or equal to 7 and less than or equal to 9). Other ranges are also possible.

Surfactant(s)

In some embodiments, a binder composition comprises one or more surfactant(s). The surfactant(s) may increase the penetration of the binder composition into a composite layer and/or may enhance the jetting performance of the binder composition. It is also believed that the surfactants may increase the amount of spreading of the binder composition in a powder layer. In some embodiments, the surfactant(s) may reduce the level of foaming in the binder composition during one or more processes associated with additive manufacturing (e.g., transport to and/or deposition by a print head) and/or may enhance the rate at which the binder composition can refill a print head (e.g., a thermal print head).

Some binder compositions may comprise ionic surfactants and some binder compositions may comprise non-ionic surfactants. Non-limiting examples of suitable ionic surfactants include sulfates (e.g., ammonium lauryl sulfate, sodium lauryl sulfate, sodium laureth sulfate, sodium myreth sulfate, perfluorooctanesulfonate, perfluorobutanesulfonate), sulfosuccinates (e.g., dioctyl sodium sulfosuccinate), ethers (e.g., alkyl-aryl ether phosphates, alkyl ether phosphates), sodium stearate, sodium lauroyl sarcosinate, perfluorononanoate, and perfluorooctanoate. Non-limiting examples of suitable non-ionic surfactants include Surfynol 440, Surfynol 2502, Surfynol 604, Thetawet TS 8230, Thetawet FS-8150, polyoxyl 35 castor oil, lauryldimethylamine oxide, Triton X-100, and Dynol 604.

In some embodiments, a binder composition comprises a surfactant or combination of surfactants that make up greater than or equal to 0 wt %, greater than or equal to 0.01 wt %, greater than or equal to 0.02 wt %, greater than or equal to 0.05 wt %, greater than or equal to 0.075 wt %, greater than or equal to 0.1 wt %, greater than or equal to 0.2 wt %, greater than or equal to 0.3 wt %, greater than or equal to 0.4 wt %, greater than or equal to 0.5 wt %, greater than or equal to 0.6 wt %, greater than or equal to 0.7 wt %, greater than or equal to 0.8 wt %, greater than or equal to 0.9 wt %, greater than or equal to 1.0 wt %, greater than or equal to 1.25 wt %, greater than or equal to 1.50 wt % of the binder composition, or greater than or equal to 1.75 wt %. In some embodiments, a binder composition comprises a surfactant or combination of surfactants that make up less than or equal to 2 wt %, less than or equal to 1.75 wt %, less than or equal to 1.5 wt %, less than or equal to 1.25 wt %, less than or equal to 1.0 wt %, less than or equal to 0.9 wt %, less than or equal to 0.8 wt %, less than or equal to 0.7 wt %, less than or equal to 0.6 wt %, less than or equal to 0.5 wt %, less than or equal to 0.4 wt %, less than or equal to 0.3 wt %, less than or equal to 0.2 wt %, less than or equal to 0.1 wt %, less than or equal to 0.075 wt %, less than or equal to 0.05 wt %, less than or equal to 0.02 wt %, or less than or equal to 0.01 wt % of the binder composition. In some cases, however, no surfactant is present in the binder composition. Combinations of the above-referenced ranges are also possible (e.g., greater than or equal to 0 wt % and less than or equal to 1 wt %, greater than or equal to 0.01 wt % and less than or equal to 1 wt %, greater than or equal to 0.01 wt % and less than or equal to 0.05 wt %, greater than or equal to 0.1 wt % and less than or equal to 1 wt %, greater than or equal to 0.1 wt % and less than or equal to 0.5 wt %, or greater than or equal to 0.5 wt % and less than or equal to 1 wt %). Other ranges are also possible. It should also be understood that a single surfactant may be present in a binder composition in one or more of the above-referenced ranges (e.g., that further comprises other, different surfactants or that lacks other, different surfactants) and/or the total amount of surfactant in a binder composition may be in one or more of the above-referenced ranges.

Biocide(s)

In some embodiments, a binder composition comprises one or more biocide(s). The biocide(s) may inhibit the growth of biological species (e.g., bacteria, yeast, fungi) in the binder composition during storage and/or inhibit enzymatic degradation of a diol and/or polyol in the binder composition during storage.

Binder compositions described herein may comprise one or more biocides that are microbicides and/or one or more biocides that are fungicides. In some embodiments, a binder composition comprises a biocide that is an isothiazolinone, such as ProxelGXL, 1,2-benzisothiazolin-3-one, 4,5-dichloro-2-octyl-4-isothiazolin-3-one, and 2-n-octyl-4-isothiazolin-3-one. Further examples of suitable biocides include 3-(3,4-dichlorophenyl)-1,1-dimethylurea, 2-bromo-2-nitropropane-1,3-diol, lauryldimethylamine oxide, benzalkonium chloride, and/or rotenone.

In some embodiments, a binder composition comprises a biocide or combination of biocides that make up greater than or equal to 0 wt %, greater than or equal to 0.01 wt %, greater than or equal to 0.02 wt %, greater than or equal to 0.05 wt %, greater than or equal to 0.075 wt %, greater than or equal to 0.1 wt %, greater than or equal to 0.15 wt %, or greater than or equal to 0.2 wt % of the binder composition. In some embodiments, a binder composition comprises a biocide or combination of biocides that make up less than or equal to 0.25 wt %, less than or equal to 0.2 wt %, less than or equal to 0.15 wt %, less than or equal to 0.1 wt %, less than or equal to 0.075 wt %, less than or equal to 0.05 wt %, less than or equal to 0.02 wt %, or less than or equal to 0.01 wt % of the binder composition. Combinations of the above-referenced ranges are also possible (e.g., greater than or equal to 0 wt % and less than or equal to 0.25 wt %). Other ranges are also possible. It should also be understood that a single biocide may be present in a binder composition in one or more of the above-referenced ranges (e.g., that further comprises other, different biocides or that lacks other, different biocides) and/or the total amount of biocide in a binder composition may be in one or more of the above-referenced ranges.

Humectant(s)

In some embodiments, a binder composition comprises one or more humectants. Non-limiting examples of suitable humectants include alcohols (e.g., mono- or multifunctional alcohols), ethers, lactones, lactams (e.g., substituted lactams, unsubstituted lactams), amides, amines, sulfones, sulfoxides, sulfides, carbonates, and carbamates. Further non-limiting examples of suitable humectants include hydantoin glycol (e.g., Dantocol DHE), 1,3-propanediol, 1,4-butanediol, 1,4-cyclohexanedimethanol, 1,5-pentanediol, 1,6-hexanediol, 1,2-hexanediol, 1,8-octanediol, 1,2-propanediol, 1,2-butanediol, 1,3-butanediol, 2,3-butanediol, ethylene glycol, diethylene glycol, triethylene glycol, tetraethylene glycol, poly(ethylene glycol) having a weight average molecular weight of less than 2000 Da, dipropylene glycol, propylene glycol, polypropylene glycol having weight average molecular weight less than 2000, glycerol, 1,2,6-hexanetriol, sorbitol, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, urea, biuret, triethanolamine, and diethanolamine.

In some embodiments, a binder composition comprises a humectant or combination of humectants that makes up less than or equal to 30 wt %, less than or equal to 25 wt %, less than or equal to 20 wt %, less than or equal to 17.5 wt %, less than or equal to 15 wt %, less than or equal to 12.5 wt %, less than or equal to 10 wt %, less than or equal to 7.5 wt %, less than or equal to 5 wt %, less than or equal to 2.5 wt %, or less than or equal to 1 wt % of the binder composition. In some embodiments, a binder composition comprises a humectant or combination of humectants that makes up greater than or equal to 0 wt %, greater than or equal to 1 wt %, greater than or equal to 2.5 wt %, greater than or equal to 5 wt %, greater than or equal to 7.5 wt %, greater than or equal to 10 wt %, greater than or equal to 12.5 wt %, greater than or equal to 15 wt %, greater than or equal to 17.5 wt %, greater than or equal to 20 wt %, or greater than or equal to 25 wt % of the binder composition. Combinations of the above-referenced ranges are also possible (e.g., less than or equal to 30 wt % and greater than or equal to 0 wt %). Other ranges are also possible. It should also be understood that a single humectant may be present in a binder composition in one or more of the above-referenced ranges (e.g., that further comprises other, different humectants or that lacks other, different humectants) and/or the total amount of humectant in a binder composition may be in one or more of the above-referenced ranges.

It has been observed that certain combinations of components of the binder composition may lead to any of a variety of possible advantages (e.g., increased consistency in part strength). In some such embodiments, the binder composition comprises an aqueous solution containing between 1-25 wt % (e.g., 4 wt %) of a polyamide. In some embodiments, the balance of the binder composition is water, and the balance water is present in an amount of between 50-99 wt % (e.g., 95 wt %).

The metal powders described herein may comprise a plurality of metal and/or metal alloy particles having a variety of suitable sizes. In some embodiments, a metal powder may comprise a plurality of particles having a size suitable for the formation of metal objects by additive manufacturing methods (e.g., that have good flow behavior and/or are suitable for sintering). For instance, the plurality of particles may have an advantageous value of D50 (i.e., an advantageous median particle size). In some embodiments, the plurality of particles has a D50 of greater than or equal to 3 microns, greater than or equal to 5 microns, greater than or equal to 6 microns, greater than or equal to 7 microns, greater than or equal to 9 microns, greater than or equal to 10 microns, greater than or equal to 12.5 microns, greater than or equal to 13 microns, greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. In some embodiments, the plurality of particles has a D50 of less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 13 microns, less than or equal to 12.5 microns, less than or equal to 10 microns, less than or equal to 9 microns, or less than or equal to 7 microns. Combinations of the above-referenced ranges are also possible (e.g., greater than or equal to 3 microns and less than or equal to 50 microns, greater than or equal to 5 microns and less than or equal to 50 microns, or greater than or equal to 7 microns and less than or equal to 20 microns). Other ranges are also possible. The D50 of a plurality of particles may be determined in accordance with ASTM E2651-13.

As described above, certain embodiments relate to methods of additive manufacturing by binder jet printing. Further details regarding such embodiments and the articles produced by methods of additive manufacturing are provided below.

As also described above, some methods of additive manufacturing comprise depositing a binder composition on a layer of metal powder. The layer of metal powder may be a layer that comprises a plurality of particles that are not adhered together. For instance, the metal particles in a layer of metal powder may be readily separated from each other by the application of minimal amounts of force, such as the application of forces present during typical processes of depositing a layer of metal powder and/or the application of gravity.

When present, layers of metal powder may have a variety of suitable thicknesses. In some embodiments, a layer of metal powder has a thickness of greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, greater than or equal to 45 microns, greater than or equal to 50 microns, greater than or equal to 60 microns, greater than or equal to 70 microns, greater than or equal to 80 microns, or greater than or equal to 90 microns. In some embodiments, a layer of metal powder has a thickness of less than or equal to 200 microns, less than or equal to 150 microns, less than or equal to 125 microns, less than or equal to 100 microns, less than or equal to 90 microns, less than or equal to 80 microns, less than or equal to 70 microns, less than or equal to 60 microns, less than or equal to 50 microns, less than or equal to 45 microns, less than or equal to 40 microns, less than or equal to 35 microns, less than or equal to 30 microns, or less than or equal to 20 microns. Combinations of the above-referenced ranges are also possible (e.g., greater than or equal to 10 microns and less than or equal to 200 microns, or greater than or equal to 25 microns and less than or equal to 100 microns). Other ranges are also possible.

Once a layer of metal powder has been deposited, deposition of a binder composition thereon may occur (e.g., by means of a print head, such as an ink jet print head, that ejects a plurality of droplets) at a variety of suitable velocities. In some embodiments, the binder composition is deposited at a velocity of greater than or equal to 3 m/s, greater than or equal to 4 m/s, greater than or equal to 5 m/s, greater than or equal to 6 m/s, greater than or equal to 7 m/s, greater than or equal to 8 m/s, greater than or equal to 9 m/s, greater than or equal to 10 m/s, or greater than or equal to 11 m/s. In some embodiments, the binder composition is deposited at a velocity of less than or equal to 12 m/s, less than or equal to 11 m/s, less than or equal to 10 m/s, less than or equal to 9 m/s, less than or equal to 8 m/s, less than or equal to 7 m/s, less than or equal to 6 m/s, less than or equal to 5 m/s, or less than or equal to 4 m/s. Combinations of the above-referenced ranges are also possible (e.g., greater than or equal to 3 m/s and less than or equal to 12 m/s greater than or equal to 6 m/s and less than or equal to 12 m/s). Other ranges are also possible. Binder composition velocity may be measured using a high speed camera, or a stroboscope/camera apparatus, with imaging software as described in the Examples. The velocity may be measured when droplets of the binder composition are 0.5 mm from the orifice of the print head from which they are ejected.

In some embodiments, a binder composition is deposited in the form of droplets. For instance, in some embodiments, a step of depositing a binder composition on layer of metal powder comprises producing a droplet of the binder composition and depositing the droplet of the binder composition on the layer of metal powder. When produced, droplets may have a variety of suitable volumes. In some embodiments, a method comprises producing a droplet having a volume of greater than or equal to 0.5 pL, greater than or equal to 0.75 pL, greater than or equal to 1 pL, greater than or equal to 1.5 pL, greater than or equal to 2 pL, greater than or equal to 3 pL, greater than or equal to 5 pL, greater than or equal to 7.5 pL, greater than or equal to 10 pL, greater than or equal to 12 pL, greater than or equal to 15 pL, greater than or equal to 20 pL, greater than or equal to 25 pL, greater than or equal to 30 pL, or greater than or equal to 35 pL. In some embodiments, a method comprises producing a droplet having a volume of less than or equal to 40 pL, less than or equal to 35 pL, less than or equal to 30 pL, less than or equal to 25 pL, 20 pL, less than or equal to 15 pL, less than or equal to 12 pL, less than or equal to 10 pL, less than or equal to 7.5 pL, less than or equal to 5 pL, less than or equal to 3 pL, less than or equal to 2 pL, less than or equal to 1.5 pL, less than or equal to 1 pL, or less than or equal to 0.75 pL. Combinations of the above-referenced ranges are also possible (e.g., greater than or equal to 0.5 pL and less than or equal to 40 pL, greater than or equal to 0.5 pL and less than or equal to 20 pL, greater than or equal to 0.5 pL and less than or equal to 2 pL, greater than or equal to 2 pL and less than or equal to 20 pL, or greater than or equal to 2 pL and less than or equal to 12 pL). Other ranges are also possible. Droplet volume may be measured using a high speed camera, or a stroboscope/camera apparatus, with imaging software as described in the examples. It should also be understood that some methods may comprise producing a plurality of droplets comprising one or more droplets having a volume in one or more of the above-referenced ranges and that some methods may comprise producing a plurality of droplets having an average volume in one or more of the above-referenced ranges.

In some embodiments in which a plurality of droplets of a binder composition are produced, they may be produced in a manner such that they have a relatively uniform volume. Production of droplets with relatively uniform volumes may enhance the precision with which features in a composite layer can be formed, as it may allow more control over the amount and location of the binder composition in the composite layer by reducing the amount of unwanted droplets and/or droplets of unwanted volumes. Volume uniformity may enhance control over the volumetric ratio of the binder composition to the metal powder on which it is deposited, which may promote better control over the properties of the metal object fabricated therefrom.

In some embodiments, a plurality of droplets comprises almost exclusively main droplets and very few satellite droplets. In other words, the binder composition may form droplets in a manner that does not substantially form satellite droplets. The satellite droplets may be droplets having a smaller volume than the main droplets. In some embodiments, satellite droplets have a volume of less than or equal to 1.5 pL, less than or equal to 1 pL, or less than or equal to 0.5 pL. For instance, in some embodiments, less than 1% of the droplets within a plurality of droplets are satellite droplets (e.g., less than 1% of the droplets have a volume of less than or equal to 1.5 pL, less than or equal to 1 pL, or less than or equal to 0.5 pL when the main droplets have a volume of greater than or equal to 0.5 pL, greater than or equal to 1 pL, or greater than or equal to 1.5 pL). In some embodiments, a plurality of droplets comprises exclusively main droplets and no satellite droplets and/or a binder formulation forms droplets in a manner that does not form satellite droplets. The presence of satellite droplets, and their amount, may be determined by using the technique described for measuring droplet volume described above.

Droplets of a binder composition may be produced in a variety of suitable manners. In some embodiments, one or more droplets of a binder composition are produced by a print head, such as a piezoelectric print head or a thermal print head. Without wishing to be bound by any particular theory, it is believed that piezoelectric print heads may be configured to form larger droplets comprising a binder composition than thermal print heads (e.g., piezoelectric print heads may be configured to form droplets having volumes of greater than or equal to 2 pL and less than or equal to 20 pL, while thermal print heads may be configured to form droplets having volumes of greater than or equal to 0.5 pL and less than or equal to 2 pL). Non-limiting examples of suitable print heads include SAMBA (FujiFilm Co.), SG-1024 (Fujifilm Co.), XAAR 5601 (XAAR, plc), VersaPass (Memjet), Duralink (Memjet), and Duraflex (Memjet).

As described above, certain embodiments relate to three-dimensional compositions. The three-dimensional compositions may include a metal powder and a binder composition. The binder composition may comprise one or more of the components described elsewhere herein with respect to binder compositions (e.g., water, a diol and/or polyol, a cross-linking agent, and/or an optional surfactant or co-solvent.

As described above, certain embodiments relate to the drying and/or cross-linking of a binder composition and certain embodiments relate to metal-based composite structures formed by the drying and/or cross-linking of a binder composition positioned in a three-dimensional composition. Further details regarding such embodiments are provided below.

As also described above, the drying and/or cross-linking of a binder composition may be accomplished by exposing the binder composition to a stimulus that is heat. The temperature to which the binder composition is heated may be sufficient to dry and/or cross-link the binder composition without appreciably degrading the portion(s) of the binder composition, if any, configured to remain in the metal-based composite structure during this step. In some embodiments, drying and/or cross-linking a binder composition comprises heating an environment in which a three-dimensional composition is positioned to a temperature of greater than or equal to 90° C., greater than or equal to 100° C., greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., greater than or equal to 200° C., greater than or equal to 210° C., greater than or equal to 220° C., greater than or equal to 230° C., or greater than or equal to 240° C. In some embodiments, drying and/or cross-linking a binder composition comprises heating an environment in which the three-dimensional composition is positioned to a temperature of less than or equal to 250° C., less than or equal to 240° C., less than or equal to 230° C., less than or equal to 220° C., less than or equal to 210° C., less than or equal to 200° C., less than or equal to 190° C., less than or equal to 180° C., less than or equal to 170° C., less than or equal to 160° C., less than or equal to 150° C., less than or equal to 140° C., less than or equal to 130° C., less than or equal to 120° C., or less than or equal to 100° C. Combinations of the above-referenced ranges are also possible (e.g., greater than or equal to 90° C. and less than or equal to 250° C., greater than or equal to 120° C. and less than or equal to 220° C.). Other temperatures are also possible. The temperature chosen for the environment during the drying and/or cross-linking may depend on the composition of the environment (e.g., to avoid prematurely de-binding). For example, in some embodiments in which the heating environment is an oxidative gaseous environment (e.g., air), the environment may be heated to a temperature of less than or equal to 220° C., while in some embodiments in which the heating environment is an inert environment, the environment may be heated to a temperature of less than or equal to 250° C. The temperature of an environment may be determined by use of a thermocouple positioned in the environment.

Non-limiting examples of suitable environments in which a three-dimensional composition may be positioned during drying and/or heating of the binder composition include an oven and a powder bed. The relevant environment may comprise a variety of suitable types of gases. By way of example, the relevant environment may comprise an oxidative environment such as air, may comprise hydrogen, and/or may comprise an inert gas (e.g., nitrogen, argon, helium). Certain gas species (e.g., hydrogen, helium) may contribute to a relatively high thermal conductivity during drying and/or heating. In some embodiments, the relevant environment may lack species that are reactive at the temperature to which the environment is heated. By way of example, the relevant environment may be an inert environment (e.g., it may comprise, consist essentially of, and/or consist of an inert gas such as nitrogen and/or argon). The pressure of the relevant environment may generally be selected as desired. Some relevant environments may be at atmospheric pressure; some may be at a pressure less than atmospheric pressure.

Drying and/or heating a three-dimensional composition may be performed for a variety of suitable amounts of time. The time may be selected to provide a desired level of drying and/or cross-linking of the binder composition. By way of example, if a light level of drying and/or cross-linking is desired, a drying and/or cross-linking step may be performed for a relatively short time. Similarly, if a relatively high level of drying and/or cross-linking is desired, a drying and/or cross-linking step may be performed for a relatively long time. In some embodiments, a drying and/or cross-linking step comprises heating an environment in which a three-dimensional composition is positioned for a time period of greater than or equal to 15 minutes, greater than or equal to 30 minutes, greater than or equal to 45 minutes, greater than or equal to 1 hour, greater than or equal to 90 minutes, greater than or equal to 2 hours, greater than or equal to 3 hours, greater than or equal to 4 hours, greater than or equal to 5 hours, greater than or equal to 6 hours, greater than or equal to 8 hours, greater than or equal to 10 hours, greater than or equal to 12 hours, greater than or equal to 14 hours, greater than or equal to 16 hours, greater than or equal to 18 hours, greater than or equal to 20 hours, greater than or equal to 1 day, greater than or equal to 2 days, greater than or equal to 3 days, greater than or equal to 4 days, greater than or equal to 100 hours, greater than or equal to 5 days, or greater than or equal to 6 days. In some embodiments, a drying and/or cross-linking step comprises heating an environment in which a three-dimensional composition is positioned for a time period of less than or equal to 1 week, less than or equal to 6 days, less than or equal to 5 days, less than or equal to 100 hours, less than or equal to 4 days, less than or equal to 3 days, less than or equal to 2 days, less than or equal to 1 day, less than or equal to 20 hours, less than or equal to 18 hours, less than or equal to 16 hours, less than or equal to 14 hours, less than or equal to 12 hours, less than or equal to 10 hours, less than or equal to 8 hours, less than or equal to 6 hours, less than or equal to 5 hours, less than or equal to 4 hours, less than or equal to 3 hours, less than or equal to 140 minutes, less than or equal to 120 minutes, or less than or equal to 100 minutes. Combinations of the above-referenced ranges are also possible (e.g., greater than or equal to 15 minutes and less than or equal to 6 days, greater than or equal to 15 minutes and less than or equal to 120 minutes, or greater than or equal to 45 minutes and less than or equal to 120 minutes). Other ranges are also possible.

In some embodiments, drying and/or heating a three-dimensional composition comprises heating the environment in which the three-dimensional composition is positioned to one temperature in one or more of the above-referenced ranges and holding the temperature of the environment threat for an amount of time in one of the above-referenced ranges. In some embodiments, drying and/or heating a three-dimensional composition comprises heating an environment in which the three-dimensional composition is positioned to two or more temperatures in the above-referenced ranges sequentially and holding the temperature of the environment at each of the two or more temperatures. In such embodiments, the relevant environment may be held at each of the relevant temperatures for a period of time in one or more of the above-referenced ranges and/or may be heated such that the total time it is held at all of the relevant temperatures is in one or more of the above-referenced ranges.

In some embodiments, drying and/or heating a three-dimensional composition is performed in a manner that reduces the tendency of the three-dimensional object to form cracks. For instance, drying and/or heating a three-dimensional composition may be performed in a manner such that changes between temperatures are performed relatively slowly. In some embodiments, drying and/or heating a three-dimensional composition is performed such that the change in temperature of the environment in which the three-dimensional object is positioned is less than or equal to 2° C./min, less than or equal to 1.5° C./min, less than or equal to 1° C./min, at less than or equal to 0.75° C./min, less than or equal to 0.5° C./min, or less than or equal to 0.25° C./min. In some embodiments, drying and/or heating a three-dimensional composition is performed such that that the change in temperature of the environment in which the three-dimensional composition is positioned is greater than or equal to 0.1° C./min, greater than or equal to 0.25° C./min, greater than or equal to 0.5° C./min, greater than or equal to 0.75° C./min, greater than or equal to 1° C./min, greater than or equal to 1.5° C./min. Combinations of the above-referenced ranges are also possible (e.g., greater than or equal to 2° C./min and less than or equal to 0.1° C./min). Other ranges are also possible. In some embodiments, the temperature of the environment in which the three-dimensional composition is positioned is either constant or changes at a rate in one or more of the ranges described above throughout a drying and/or cross-linking process. In some embodiments, a drying and/or cross-linking process comprises a change in temperature at a rate in one or more of the ranges described above but also comprises further changes in temperature (e.g., at a rate in one or more of the ranges described above, at a rate outside of the ranges described above).

As described above, certain embodiments relate to metal-based composite structures. Further details regarding such embodiments are provided below.

In some embodiments, a metal-based composite structure is provided. The metal-based composite structure may comprise a metal powder (e.g., a metal powder comprising a noble metal or noble metal alloy) coated at least in part with a first material, one or more components of a binder composition that include a second material (e.g., a diol and/or polyol), and/or one or more reaction products of one or more components of a binder composition (e.g., a polymer formed by a reaction of the first material with the second material present in the binder composition).

In some embodiments, a metal-based composite structure comprises a polymer binder. For instance, the polymer binder may adhere to particles positioned in the composite layer and may have sufficient cohesive strength to form a self-supporting structure in which the particles are embedded.

A metal powder present in a metal-based composite structure may make up any suitable amount thereof. In some embodiments, the metal powder makes up greater than or equal to 92 wt %, greater than or equal to 93 wt %, greater than or equal to 94 wt %, greater than or equal to 95 wt %, greater than or equal to 96 wt %, greater than or equal to 97 wt %, greater than or equal to 98 wt %, greater than or equal to 99 wt %, or greater than or equal to 99.8 wt % of the metal-based composite structure. In some embodiments, the metal powder makes up less than or equal to 99.9 wt %, less than or equal to 99.5 wt %, less than or equal to 99 wt %, less than or equal to 98 wt %, less than or equal to 97 wt %, less than or equal to 96 wt %, less than or equal to 95 wt %, less than or equal to 94 wt %, or less than or equal to 93 wt % of the metal-based composite structure. Combinations of the above-referenced ranges are also possible (e.g., greater than or equal to 92 wt % and less than or equal to 99.9 wt %, greater than or equal to 96 wt % and less than or equal to 99.9 wt %, or greater than or equal to 97 wt % and less than or equal to 99.8 wt %). Other ranges are also possible.

The metal-based composite structures described herein may have advantageously have relatively high transverse flexural strengths. Desirably, high values of transverse flexural strength may reduce the tendency of metal-based composite structures to fail during further additive manufacturing steps. In some embodiments, a metal-based composite structure has a transverse flexural strength of greater than or equal to 1 MPa, greater than or equal to 2 MPa, greater than or equal to 3 MPa, greater than or equal to 5 MPa, greater than or equal to 7.5 MPa, greater than or equal to 10 MPa, greater than or equal to 20 MPa, greater than or equal to 50 MPa, greater than or equal to 75 MPa, greater than or equal to 100 MPa, or greater than or equal to 125 MPa. In some embodiments, a metal-based composite structure has a transverse flexural strength of less than or equal to 150 MPa, less than or equal to 125 MPa, less than or equal to 100 MPa, less than or equal to 75 MPa, less than or equal to 50 MPa, less than or equal to 20 MPa, less than or equal to 10 MPa, less than or equal to 7.5 MPa, less than or equal to 5 MPa, or less than or equal to 2 MPa. Combinations of the above-referenced ranges are also possible (e.g., greater than or equal to 1 MPa and less than or equal to 150 MPa, greater than or equal to 2 MPa and less than or equal to 150 MPa, or greater than or equal to 3 MPa and less than or equal to 100 MPa). Other ranges are also possible.

The transverse flexural strength of a metal-based composite structure may be the transverse flexural strength as determined by the three-point bending test described in ASTM B312-14 and/or may be the transverse flexural strength as determined by the four-point bending test described in ASTM C1161-18. In other words, some metal-based composite structures may have transverse flexural strengths as determined by the three-point bending test described in ASTM B312-14 in one or more of the above-referenced ranges, some metal-based composite structures may have transverse flexural strengths as determined by the four-point bending test described in ASTM C1161-18 in one or more of the above-referenced ranges, and some metal-based composite structures may have transverse flexural strengths as determined by the three-point bending test described in ASTM B312-14 and as determined the four-point bending test described in ASTM C1161-18 in one or more of the above-referenced ranges.

As described above, certain embodiments relate to heating metal-based composite structures. Certain embodiments relate to de-bound metal structures formed by heating metal-based composite structures (e.g., during step 70 in FIGS. 1A-1B). Further details regarding such embodiments are provided below.

De-bound metal structures may advantageously include relatively low levels of certain elements. For instance, in some embodiments, a de-bound metal structure comprises relatively small amounts of carbon and/or oxygen. As described elsewhere herein, such components may react undesirably with the metal in the de-bound metal structure during further additive manufacturing steps (e.g., during a sintering step). By way of example, carbon in a de-bound metal structure may react undesirably with surface oxides also therein.

In some embodiments, carbon makes up less than or equal to 0.5 wt %, less than or equal to 0.4 wt %, less than or equal to 0.2 wt %, less than or equal to 0.1 wt %, less than or equal to 0.05 wt %, or less than or equal to 0.02 wt % of the de-bound metal structure. In some embodiments, carbon makes up greater than or equal to 0 wt %, greater than or equal to 0.02 wt %, greater than or equal to 0.05 wt %, greater than or equal to 0.1 wt %, greater than or equal to 0.2 wt %, or greater than or equal to 0.4 wt % of the de-bound metal structure. Combinations of the above-referenced ranges are also possible (e.g., less than or equal to 0.5 wt % and greater than or equal to 0 wt %, or less than or equal to 0.1 wt % and greater than or equal to 0 wt %). Other ranges are also possible. The amount of carbon in the de-bound metal structure may be determined in accordance with ASTM E1019.

In some embodiments, oxygen makes up less than or equal to 1.5 wt %, less than or equal to 1.3 wt %, or less than or equal to 1.1 wt % of the de-bound metal structure. The amount of oxygen in the de-bound metal structure may be determined in accordance with ASTM E1019.

As described above, certain embodiments relate to the formation of metal objects from de-bound metal structures and/or composite metal structures. Certain embodiments relate to metal objects. Further details regarding such embodiments are provided below.

Some metal objects described herein advantageously both comprise a metal and/or metal alloy and have a density that is relatively close to the density of the metal and/or alloy included therein. Metal objects having this property may include a relatively low amount of internal pores (i.e., pores included in the bulk of the metal object and not in fluidic communication with an environment external to the metal object) and/or may include internal pores that make up a relatively small volume fraction of the metal object. Low amounts and/or volume fractions of internal pores may desirably increase the robustness and strength of the metal object.

The relationship between the density of a metal object and the density of a metal alloy included therein may be parametrized by a relative density. As used herein, the relative density may be computed by dividing the bulk density of the metal object by the bulk density of the relevant metal alloy and multiplying by 100%. Accordingly, a relative density of 100% would indicate that the metal object has a density identical to the bulk metal alloy included therein while a relative densities of less than 100% would indicate that the metal object has a density less than the metal alloy included therein. The bulk density of a metal object may be computed in accordance with ASTM B962-17. It should be understood that internal pores would contribute to this volume (because they are entirely enclosed by the outer boundary of the metal object) while open pores and other features partially enclosed by a metal object would not contribute to this volume.

In some embodiments, a metal object has a relative density of greater than or equal to 90%, greater than or equal to 91%, greater than or equal to 92%, greater than or equal to 93%, greater than or equal to 94%, greater than or equal to 95%, greater than or equal to 96%, greater than or equal to 97%, greater than or equal to 98%, or greater than or equal to 99%. In some embodiments, a metal object has a relative density of less than or equal to 100%, less than or equal to 99.9%, less than or equal to 99%, less than or equal to 98%, less than or equal to 97%, less than or equal to 96%, less than or equal to 95%, less than or equal to 94%, less than or equal to 93%, less than or equal to 92%, or less than or equal to 91%. Combinations of the above-referenced ranges are also possible (e.g., greater than or equal to 90% and less than or equal to 100%, or greater than or equal to 93% and less than or equal to 100%). Other ranges are also possible.

Metal objects described herein may have a chemical composition similar to the metal powders from which they were formed. For instance, a metal object may comprise a noble metal or noble metal alloy from the noble metal powder, such as sterling silver. Non-limiting examples of suitable metal alloys include argentium silver (e.g., 93.5 wt % or 96 wt % silver alloyed with other metals or metalloids, such as germanium), yellow gold (e.g., 75 wt % gold, 16 wt % silver, 9 wt % copper), rose gold (e.g., 75 wt % gold, 6 wt % silver, 19 wt % copper), platinum (e.g., 95 wt % platinum and 5 wt % ruthenium). In some instances, the weight percent of the noble metal and/or noble metal alloy from the noble metal powder in the metal object is greater than or equal to 90 wt %, greater than or equal to 93 wt %, greater than or equal to 95 wt %, greater than or equal to 97 wt %, greater than or equal to 98 wt %, and/or up 99 wt %, up to 99.5 wt %, up to 99.9 wt %, or more. Combinations of these ranges are possible (e.g., a wt % of between 93 wt % and 99 wt %.

For convenience, certain terms employed in the specification, examples, and appended claims are listed here. Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of additive manufacturing comprising:
   forming ones or more parts by performing, a plurality of times:
      depositing a layer of metal powder, wherein particles of the metal powder are coated with a first material; and
      depositing a binder composition on at least a portion of the layer of metal powder, the binder composition comprising a second material; and
      curing the metal powder and binder composition, wherein said curing causes the first material to react with the second material and thereby form a polymer, wherein the first material comprises dimethyl terephthalate diester.

2. The method of claim 1, wherein curing the metal powder and binder composition comprises heating the metal powder and binder composition.

3. The method of claim 1, wherein curing the metal powder and binder composition comprises heating the metal powder and binder composition to above 180° C.

4. The method of claim 1, wherein the first material comprises a monomer.

5. The method of claim 1, wherein the first material comprises an aliphatic diester or an aromatic diester.

6. The method of claim 1, wherein the second material is a dial or a polyol.

7. The method of claim 1, wherein the second material is polyethylene glycol.

8. The method of claim 1, wherein the second material is monoethylene glycol.

9. The method of claim 1, wherein the binder composition comprises the second material in an amount greater than 90% w/w.

10. The method of claim 1, wherein the polymer is polyethyleterphthalate (PET).

11. The method of claim 1, wherein the polymer is a polyester.

12. The method of claim 1, wherein the binder composition does not comprise a polymer.

13. The method of claim 1, wherein the binder composition comprises water and ethylene glycol.

14. A method of additive manufacturing comprising:

forming ones or more parts by performing, a plurality of times:

depositing a layer of metal powder, wherein particles of the metal powder are coated with a first material; and depositing a binder composition on at least a portion of the layer of metal powder, the binder composition comprising a second material; and curing the metal powder and binder composition, wherein said curing causes the first material to react with the second material and thereby form a polymer, wherein the polymer is a polyester.

15. A method of additive manufacturing comprising:

forming ones or more parts by performing, a plurality of times:

depositing a layer of metal powder, wherein particles of the metal powder are coated with a first material; and depositing a binder composition on at least a portion of the layer of metal powder, the binder composition comprising a second material; and curing the metal powder and binder composition, wherein said curing causes the first material to react with the second material and thereby form a polymer, wherein the binder composition does not comprise a polymer.

* * * * *